US012179047B2

(12) United States Patent
Novotny et al.

(10) Patent No.: US 12,179,047 B2
(45) **Date of Patent: *Dec. 31, 2024**

(54) HORIZONTAL LIFELINE SHUTTLE APPARATUS

(71) Applicant: Honeywell International Inc., Charlotte, NC (US)

(72) Inventors: Josef Novotny, Kuncina (CZ); Viliam Gdovec, Slapanice (CZ); Marketa Audyova, Brno (CZ); Scott Hugh Bradford, Cumnock (GB)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,132

(22) Filed: Oct. 31, 2023

(65) Prior Publication Data

US 2024/0058633 A1 Feb. 22, 2024

Related U.S. Application Data

(63) Continuation of application No. 16/832,889, filed on Mar. 27, 2020, now Pat. No. 11,833,376.

(Continued)

(51) Int. Cl.
*A62B 35/00* (2006.01)

(52) U.S. Cl.
CPC ...... *A62B 35/0081* (2013.01); *A62B 35/0056* (2013.01); *A62B 35/0068* (2013.01)

(58) Field of Classification Search
CPC ............ A62B 35/0056; A62B 35/0068; A62B 35/0081; A62B 1/14; A62B 35/005;

(Continued)

(56) References Cited

U.S. PATENT DOCUMENTS

| | | | |
|---|---|---|---|
| 217,942 A | 7/1879 | Hayden | |
| 307,028 A | 10/1884 | Durand | |

(Continued)

FOREIGN PATENT DOCUMENTS

| | | | |
|---|---|---|---|
| AT | 510436 B1 | 4/2012 | |
| CN | 113350709 A * | 9/2021 | .............. A62B 1/14 |

(Continued)

OTHER PUBLICATIONS

Advisory Action (PTOL-303) Mailed on Jan. 25, 2023 for U.S. Appl. No. 16/832,889.

(Continued)

*Primary Examiner* — Taylor Morris
(74) *Attorney, Agent, or Firm* — Alston & Bird LLP

(57) ABSTRACT

A horizontal lifeline shuttle apparatus is provided. The horizontal lifeline shuttle apparatus includes an attachment portion, a body portion, and a cable channel. The body portion is configured to at least partially surround a portion of a cable so as to retain the portion of the cable within a cable channel The attachment portion is configured to move relative to the body portion based at least in part on the motion of the moveable pin fixedly secured thereto. At least a portion of the moveable pin is disposed within each of a plurality of moveable pin guide grooves positioned within the body portion such that a range of motion of the moveable pin is defined at least in part by the plurality of moveable pin grooves. At least one of the plurality of moveable pin grooves comprises a vertical portion.

13 Claims, 15 Drawing Sheets

Related U.S. Application Data

(60) Provisional application No. 62/929,587, filed on Nov. 1, 2019.

(58) Field of Classification Search
CPC . A62B 35/04; A62B 35/0087; A62B 35/0075; E04G 21/3204; E06C 7/186; F16B 45/04; F16B 45/02; F16B 2/185; F16B 45/06; F16B 13/0808; F16B 2/18; B25B 5/12; B25B 7/123
USPC .............................................................. 182/5
See application file for complete search history.

(56) References Cited

U.S. PATENT DOCUMENTS

| | | | | |
|---|---|---|---|---|
| 1,241,806 | A | 10/1917 | Samuel | |
| 1,630,484 | A | 5/1927 | Fritts | |
| 2,817,556 | A | 12/1957 | White | |
| 2,864,644 | A | 12/1958 | Marryatt | |
| 4,005,904 | A | 2/1977 | Weman et al. | |
| 4,034,828 | A | 7/1977 | Rose et al. | |
| 4,721,182 | A | 1/1988 | Brinkmann et al. | |
| 4,911,394 | A | 3/1990 | Ericson | |
| 5,279,385 | A | 1/1994 | Riches et al. | |
| 5,292,165 | A | 3/1994 | Wiklund | |
| 5,323,873 | A | 6/1994 | Pelofi | |
| 5,343,975 | A | 9/1994 | Riches et al. | |
| D355,583 | S | 2/1995 | Beauchane | |
| D357,435 | S | 4/1995 | Cook | |
| D361,665 | S | 8/1995 | Izumi | |
| 6,073,724 | A * | 6/2000 | Wolner | E04G 21/3261 182/36 |
| 6,467,574 | B2 | 10/2002 | Lara | |
| D512,307 | S | 12/2005 | Ahrens | |
| 7,007,772 | B2 | 3/2006 | Argoud | |
| 7,032,944 | B2 | 4/2006 | Moilanen et al. | |
| 7,478,497 | B2 * | 1/2009 | Otsuka | A01K 97/14 177/148 |
| 8,226,138 | B2 | 7/2012 | Rocourt et al. | |
| 8,397,351 | B2 | 3/2013 | Lara et al. | |
| 8,424,638 | B1 * | 4/2013 | Guthrie | E04G 21/3276 248/499 |
| D741,701 | S | 10/2015 | McNeil et al. | |
| D744,320 | S | 12/2015 | Parrish | |
| 9,199,105 | B1 | 12/2015 | Hung | |
| 9,320,924 | B2 | 4/2016 | Patel et al. | |
| 9,441,653 | B2 | 9/2016 | Wang | |
| D775,514 | S | 1/2017 | Muhlenkamp et al. | |
| 9,759,244 | B2 | 9/2017 | Slagle | |
| 9,913,999 | B2 * | 3/2018 | Balquist | A62B 35/0093 |
| D814,273 | S | 4/2018 | Karpanty et al. | |
| D843,887 | S | 3/2019 | Frost et al. | |
| 10,286,232 | B2 | 5/2019 | Ostrobrod | |
| 10,449,400 | B2 | 10/2019 | Roth et al. | |
| D874,556 | S | 2/2020 | Hanudel | |
| D875,507 | S | 2/2020 | Petzl | |
| D911,153 | S | 2/2021 | Auston | |
| 10,967,209 | B2 | 4/2021 | Milbright | |
| D924,468 | S | 7/2021 | Huang | |
| D926,022 | S | 7/2021 | Luhrmann | |
| D928,032 | S | 8/2021 | Okumu | |
| 2002/0050421 | A1 | 5/2002 | Lara | |
| 2007/0119653 | A1 | 5/2007 | Brown et al. | |
| 2007/0261915 | A1 | 11/2007 | Auston | |
| 2010/0108440 | A1 | 5/2010 | Maes et al. | |
| 2010/0314196 | A1 | 12/2010 | De Boeck | |
| 2011/0186388 | A1 | 8/2011 | Sudale et al. | |
| 2011/0297480 | A1 | 12/2011 | Jones et al. | |
| 2012/0210542 | A1 | 8/2012 | Yang | |
| 2012/0217092 | A1 | 8/2012 | Jones et al. | |
| 2013/0071177 | A1 | 3/2013 | Wang | |
| 2014/0304898 | A1 | 10/2014 | Bachtold | |
| 2015/0114752 | A1 | 4/2015 | Bornack | |
| 2015/0217148 | A1 | 8/2015 | Eltringham et al. | |
| 2016/0310767 | A1 | 10/2016 | Resch et al. | |
| 2017/0260762 | A1 | 9/2017 | Ostrobrod | |
| 2018/0212408 | A1 | 7/2018 | Nagaki et al. | |
| 2018/0243594 | A1 | 8/2018 | Poldmaa | |
| 2019/0277088 | A1 | 9/2019 | Ostrobrod | |
| 2020/0114183 | A1 | 4/2020 | Mamie et al. | |
| 2020/0121962 | A1 | 4/2020 | Saunders | |
| 2020/0309237 | A1 | 10/2020 | Delteil | |
| 2022/0152436 | A1 | 5/2022 | Squire | |
| 2023/0166137 | A1 * | 6/2023 | Squire | A62B 35/0087 182/3 |

FOREIGN PATENT DOCUMENTS

| | | | | |
|---|---|---|---|---|
| DE | 102010015572 | A1 | 11/2010 | |
| DE | 102012207224 | B3 * | 9/2013 | A62B 1/14 |
| DE | 202015102784 | U1 | 7/2015 | |
| EP | 0861678 | A2 | 9/1998 | |
| EP | 1452206 | B1 | 9/2007 | |
| EP | 2606937 | A2 | 6/2013 | |
| EP | 3369460 | A1 | 9/2018 | |
| EP | 3815751 | A1 | 5/2021 | |
| GB | 2389386 | A | 12/2003 | |
| GB | 2398822 | A | 9/2004 | |
| GB | 2420820 | A | 6/2006 | |
| GB | 2459654 | A * | 11/2009 | A62B 35/0056 |
| GB | 2514155 | A | 11/2014 | |
| KR | 101283056 | B1 * | 1/2013 | E04G 21/3204 |
| KR | 10-1486332 | B1 | 1/2015 | |
| WO | 96/02456 | A1 | 2/1996 | |
| WO | 2005/058422 | A1 | 6/2005 | |
| WO | 2009/133361 | A1 | 11/2009 | |
| WO | 2012/164279 | A2 | 12/2012 | |
| WO | WO-2017030558 | A1 * | 2/2017 | A62B 1/14 |

OTHER PUBLICATIONS

European search opinion Mailed on Mar. 30, 2021 for EP Application No. 20202160, 6 page(s).

European search report Mailed on Mar. 30, 2021 for EP Application No. 20202160, 2 page(s).

European Search Report Mailed on Mar. 30, 2021for EP Application No. 20202160.6, 10 page(s).

Examiner Interview Summary Record (PTOL-413) Mailed on Jan. 25, 2023 for U.S. Appl. No. 16/832,889.

Final Rejection Mailed on Oct. 25, 2022 for U.S. Appl. No. 16/832,889, 13 page(s).

Honeywell Miller Söll Xenon Fall Arrester, [online], retrieved Feb. 7, 2020], retrieved from the Internet <URL: https://safety.honeywell.com/en-us/products/by-category/fall-protection/horizontal-lifeline-systems/miller-xenon-permanent-horizontal-lifeline-kits, 3 pages.

Honeywell Miller Söll Xenon Fall Arrester, [online], retrieved Feb. 7, 2020], retrieved from the Internet <URL: https://www.honeywellsafety.com/assets/0/324/936/5f9f7a6e-e9c6-4a8f-a7a2-866a4a81c865.jpg, 1 page.

Honeywell Miller Xenon™ Permanent Horizontal Lifeline Kits, [online], retrieved Feb. 7, 2020], retrieved from the Internet <URL: https://www.honeywellsafety.com/assets/0/324/936/5f9f7a6e-e9c6-4a8f-a7a2-866a4a81c865.jpg, 1 page.

Honeywell Miller Xenon™ Permanent Horizontal Lifeline Kits, [online], retrieved Feb. 7, 2020], retrieved from the Internet <URL: //https://safety.honeywell.com/en-us/products/by-category/fall-protection/horizontal-lifeline-systems/miller-xenon-permanent-horizontal-lifeline-kits, 3 pages.

Honeywell Miller Xenon™ Permanent Horizontal Lifeline Kits, [online], retrieved Feb. 7, 2020], retrieved from the Internet <URL: http://salcouruguay.com/wp-content/uploads/2015/12/WIRE-MILLER-XENON-LIFELINE.jpg, 1 page.

Honeywell Miller Xenon™ Permanent Horizontal Lifeline Kits, [online], retrieved Feb. 7, 2020], retrieved from the Internet <URL: https://safety.honeywell.com/content/dam/his-sandbox/products/fall-protection/images/NP_item43030_X00120.jpg, 1 page.

Honeywell Miller Xenon™ Permanent Horizontal Lifeline Kits, [online], retrieved Feb. 7, 2020], retrieved from the Internet <URL:

(56) References Cited

OTHER PUBLICATIONS https://www.honeywellsafety.com/Products/Fall_Protection/Miller_S%C3%B6ll_Xenon%C2%AE_2_0_HLL_(AUS/NZ).aspx?site=/au, 3 pages.
Honeywell Miller Xenon™ Permanent Horizontal Lifeline Kits, [online], retrieved Feb. 7, 2020], retrieved from the Internet <URL: https://www.nsafe.com/horizontallifelines.html, 3 pages.
Non-Final Rejection Mailed on Feb. 28, 2023 for U.S. Appl. No. 16/832,889.
Non-Final Rejection Mailed on May 17, 2022 for U.S. Appl. No. 16/832,889, 13 page(s).
Notice of Allowance and Fees Due (PTOL-85) Mailed on Jul. 31, 2023 for U.S. Appl. No. 16/832,889, 7 page(s).
Notice of Allowance and Fees Due (PTOL-85) Mailed on Sep. 8, 2021 for U.S. Appl. No. 29/711,712, 7 page(s).
Notice of Allowance received for U.S. Appl. No. 29/711,712, mailed on Sep. 8, 2021, 9 pages.
U.S. Appl. No. 16/832,889, filed Mar. 27, 2020, U.S. Pat. No. 11,833,376, Issued.
EP Office Action Mailed on Aug. 1, 2024 for EP Application No. 20202160, 5 page(s).

* cited by examiner

HORIZONTAL LIFELINE SHUTTLE APPARATUS

CROSS-REFERENCE TO RELATED APPLICATIONS

This patent application is a continuation of U.S. Non-Provisional patent application Ser. No. 16/832,889, filed Mar. 27, 2020, which claims priority to U.S. Provisional Patent Application No. 62/929,587, filed Nov. 1, 2019, each of which is incorporated herein by reference in its entirety.

BACKGROUND

Horizontal lifeline systems are used today to mitigate the risk of serious personal injury that often accompanies working at height, such as, for example, on a roof. In particular, such systems often include a cable anchored on each opposite end and arranged on the elevated work surface so as to generally define a travel path about the elevated work surface. In some instances, the cable may be intermittently held in position my various intermediate brackets. To avoid falling from the elevated surface, a worker tasked with walking about the elevated surface, often equipped with a harness or similar safety device operably secured to, for example, an attachment hook, may be tethered to the cable via a horizontal lifeline shuttle. The horizontal lifeline shuttle may function to provide a secure connection between the worker and the anchored cable while allowing for movement along the length of the cable by the worker attached thereto.

Accordingly, a need exists for improved horizontal lifeline shuttles characterized by an increase in user comfort, minimized product costs, production variability, and functional error. Through applied effort, ingenuity, and innovation, Applicant has solved many of these identified problems by developing solutions embodied in the present disclosure, which are described in detail below.

BRIEF SUMMARY

Various embodiments are directed to a horizontal lifeline shuttle apparatus comprising an attachment portion; and a body portion, the body portion comprising a fixed jaw; a moveable jaw; and a plurality of moveable pin grooves, at least one of the plurality of moveable pin grooves comprising a vertical portion and an angled portion; wherein at least a portion of a moveable pin is disposed within each of the plurality of moveable pin guide grooves such that a range of motion of the moveable pin is defined at least in part by the plurality of moveable pin grooves; wherein the vertical portion of the at least one of the plurality of moveable pin grooves is configured to provide a nominal position along a vertical axis in which the moveable pin may naturally settle so as to at least partially mitigate one or more effects of production variability.

In various embodiments, the body portion may further comprise a cable channel defined by at least a portion of the fixed jaw and at least a portion of the moveable jaw. In various embodiments, the body portion may be configured to at least partially surround a portion of a cable so as to retain the portion of the cable within the cable channel. Further, in certain embodiments, the attachment portion may comprise: an eyelet; and the moveable pin, the moveable pin being fixedly disposed between two opposite arms.

In various embodiments, the at least one of the plurality of moveable pin grooves comprising the vertical portion may further comprise a non-linear portion. Further, in certain embodiments, the at least one of the plurality of moveable pin grooves comprising the vertical portion may comprise an S-shaped groove profile, wherein the vertical portion may comprise an intermediate portion positioned in between two non-linear portions. In various embodiments, the at least one of the plurality of moveable pin grooves comprising the vertical portion may comprise two moveable pin grooves comprising an S-shaped groove profile, the two moveable pin grooves comprising an S-shaped groove profile may be arranged in opposite directions and positioned such that the respective vertical portions of each of the two moveable pin grooves comprising an S-shaped groove profile may be coaxially aligned.

In various embodiments, the attachment portion may be configured to be rotatable 90 degrees relative to a vertical axis to an at least substantially horizontal position on either side of the body portion. In various embodiments, the attachment portion is rotatable about a moveable pin axis. Further, in various embodiments, the attachment portion may be lockable in the at least substantially horizontal position via an engagement of at least a portion of the attachment portion with the body portion. In certain embodiments, the at least a portion of the attachment portion may comprise one or more of the opposite arms of the attachment portion. In various embodiments, the engagement of the at least a portion of the attachment portion with the body portion may comprise a surface of each of the one or more arms being configured in an at least substantially flush arrangement against a bottom surface of one or more outer portions of the body portion. In certain embodiments, at least one of the bottom surface of the one or more outer portions of the body portion may comprise a concave horizontal surface extending vertically in the direction of the one or more arms.

In various embodiments, the apparatus may be configurable between an open position, a closed position, and a standard position; wherein the apparatus may be configured in the open position based on a two-step process comprising a compression of a button element and a vertical displacement of the moveable pin, the vertical displacement of the moveable pin resulting at least in part from a force applied to the attachment portion. In various embodiments, the attachment portion further may comprise a bracket disposed between the two opposite arms of the attachment portion, the bracket being configured to facilitate an execution of the two-step process by a user using a single hand. Further, in certain embodiments, the bracket may positioned so as to at least partially block a button interface from unwarranted user interaction when the attachment portion is rotated to an at least substantially horizontal position.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
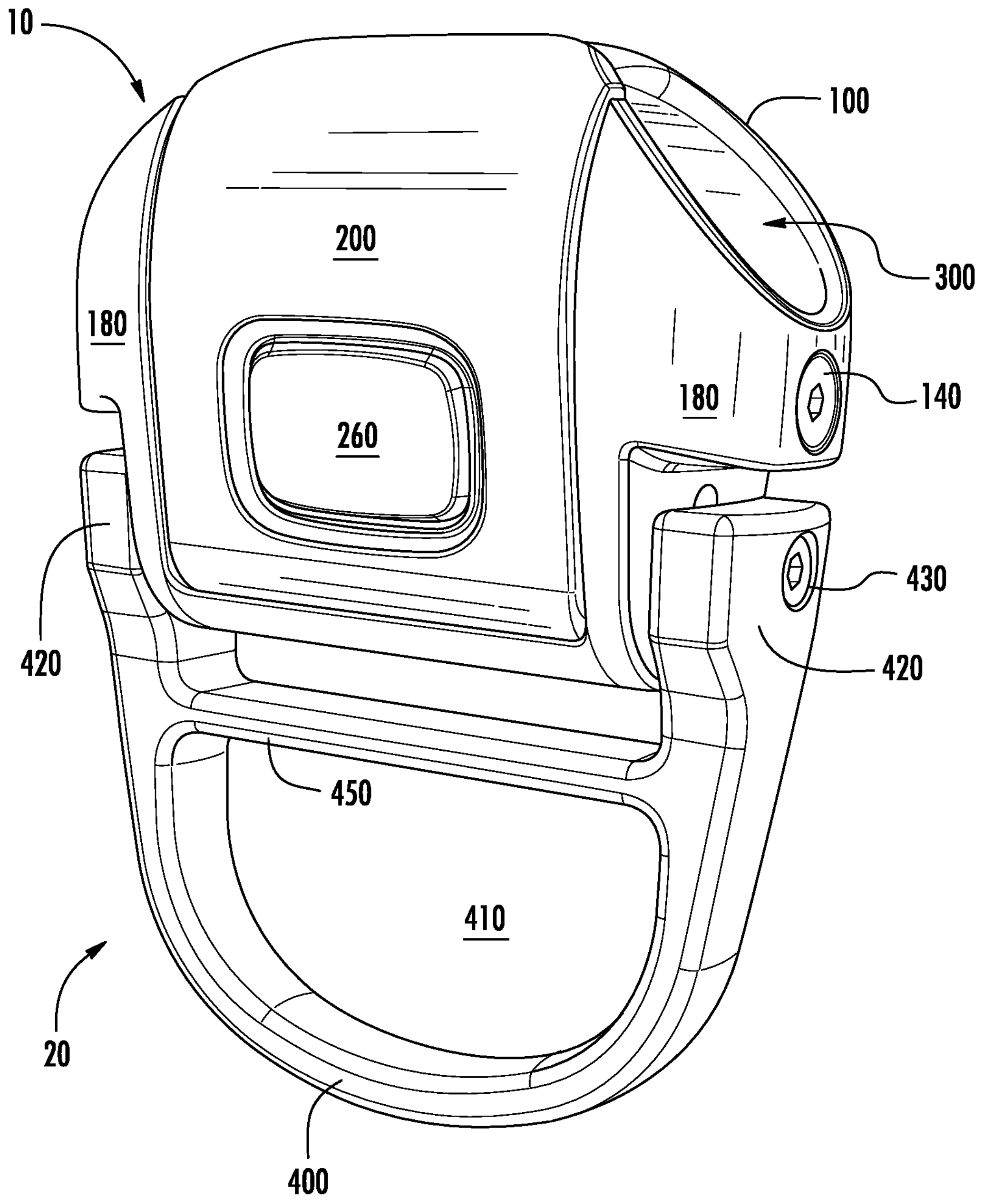
FIG. 1 illustrates a perspective view of an exemplary apparatus as described herein.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

Described herein is a horizontal lifeline shuttle apparatus configured to facilitate a secure connection between a wearable retention device secured to a person (e.g., a wearable harness connected to an attachable interface such as a hook) and an anchored horizontal lifeline, while allowing for seamless relative movement along the length of the horizontal lifeline. The horizontal lifeline shuttle apparatus may be positioned, for example, on an elevated surface and may be configured to prevent one attached thereto from falling off the elevated surface by stabilizing the secure connection upon detecting a pull force in a direction away from the anchored cable (e.g., in a fall direction during a "fall event"), thereby substantially mitigating the risk of detachment from the anchored cable. For example, the shuttle apparatus may comprise both a fixed jaw and a moveable jaw, the moveable jaw being moveable to configure the shuttle apparatus between an open, a standard, and a closed position. The fixed jaw and the moveable jaw may collectively define a cable channel that, when the shuttle apparatus is attached to a horizontal lifeline, may effectively surround a length of the horizontal lifeline such that the length of the lifeline runs through the cable channel and is retained therein. In operation, the shuttle apparatus may further comprise a cable channel gap adjacent the cable channel. As described herein, the gap is sufficiently narrow to prevent a cable present in the channel from passing therethrough, and sufficiently large so as to enable the seamless travel of the shuttle apparatus along a length of the cable that is secured by an intermediate bracket of the shuttle apparatus.

The fixed jaw of an exemplary embodiment may be rotatable about an axis defined by a fixed pin positioned within the body portion. The rotational movement of the fixed jaw about the fixed pin axis may be driven, at least in part, by the directional displacement of a moveable pin, which may be fixedly connected at either end to an attachment portion of the shuttle apparatus that is configured to engage a user's wearable retention device (or attachment thereof) and move relative to the body portion of the shuttle apparatus. As described herein, the fixed pin axis may comprise the central axis shared by the two fixed pin apertures. The moveable pin may run across the length of the body portion, passing through a plurality of grooves disposed in the respective sidewalls of both the fixed jaw and the moveable jaw. As such, the outer boundary and relative alignment of each of the plurality of moveable pin grooves collectively defines the range of motion of the moveable pin, and thus directly affects the relationship between the position of the attachment portion and the rotational position of the moveable jaw. Example embodiments described herein include a plurality of grooves each comprising a linear vertical portion and two curved portions so as to functionally prevent a moveable pin disposed within the grooves from being vertically displaced without the application of external force. As described herein, the vertical positioning of the moveable pin within the moveable pin grooves may operatively control the rotation movement of the moveable jaw, and thus, the configuration of the shuttle apparatus. As such, in an embodiment wherein the moveable pin is misaligned (e.g., the moveable pin axis is undesirably raised) due, in part, to manufacturing variability, the moveable jaw may rotate such that the shuttle apparatus may move at least away from a standard position towards either an open or closed position, depending on the direction of the error. Such an error may result in the cable channel gap widening to such an extent that a cable retained therein may get wedged between the moveable jaw and the fixed jaw, reducing the ability of the shuttle apparatus to smoothly glide along the cable in a manner that is comfortable to a user. As designed, the dual, intersecting "S-shaped" moveable pin grooves of an exemplary embodiment described herein, each comprising a vertical intermediate portion, reduce the risk of misalignment and corresponding error by providing a nominal position along a vertical axis in which a moveable pin may naturally settle, thereby mitigating the effects of production variability.

Further, the attachment portion of described in example embodiments herein comprises a rotational range of motion of approximately 180 degrees about an axis relative to the body portion of the apparatus, such that the attachment portion 20 may rotate in either a clockwise or counterclockwise direction to an at least substantially horizontal position on either side of the body portion. As designed, an exemplary embodiment described herein may lock the attachment portion in the horizontal position or a substantially horizontal position utilizing strictly the geometric features and physical engagement of the apparatus's attachment and body portions. By utilizing geometric features to effectively lock the attachment portion in a rotated position, an exemplary embodiment described herein may bypass the need for distinct mechanical locking mechanisms or other bulky and expensive external hardware. Eliminating the need for distinct locking mechanisms or other bulky hardware components reduces the cost, weight, and footprint of the apparatus without sacrificing functionality.

Exemplary Apparatus

FIG. 1 shows an exemplary apparatus according to an embodiment as described herein. As shown in FIG. 1, the horizontal lifeline shuttle apparatus may comprise a body portion 10 and an attachment portion 20. In various embodiments, the body portion 10 may comprise a fixed jaw 100 and a moveable jaw 200. The moveable jaw 200 may be configured to move relative to the fixed jaw 100 in at least a rotational direction about a central axis of a fixed pin 140. Fixed pin 140 is positioned so as to be disposed within the body portion 10 and extend across a length thereof. In various embodiments, the moveable jaw 200 may be configured to move about the central axis of a fixed pin 140 so as to configure the shuttle apparatus between at least an open position, a standard position, and closed position, as described herein. As shown, at least a portion of the moveable jaw 200 may be disposed between two outer portions 180 of the fixed jaw 100, each of which may be configured fixedly anchor one end of the fixed pin 140.

Further, the body portion 10 may comprise a button element 260, which may be configured to receive an external pushing force and, in response, move within the body portion so as to allow a user to selectively reconfigure the shuttle apparatus to an open position by applying force to the attachment portion 20, as described herein. In various embodiments, for example, one or more components of the horizontal lifeline shuttle apparatus as described herein may comprise a stainless steel material and may be manufactured using one or more processes, such as, for example, die-casting.

The body portion 10 may further comprise a cable channel 300, which may be defined collectively by at least a portion of the fixed jaw 100 and at least a portion of the moveable jaw 200 such that the cable channel 300 comprises a substantially rounded cross-sectional area. In various embodiments, the cable channel 300 may be configured to effectively surround a length of a horizontal lifeline (e.g., a rope or a cable) such that the length of the lifeline may run through the cable channel 300 and be retained therein. In such a circumstance, the shuttle apparatus is attached to the horizontal lifeline via the retention of the horizontal lifeline within the cable channel 300.

In various embodiments, the attachment portion 20 may comprise an eyelet 400, two opposite arms 420, and a moveable pin 430, which may be fixedly anchored at each of the two opposite arms 420 such that the length of the moveable pin 430, which extends across the length of the attachment portion 20. As described herein, the shuttle apparatus may be configured such that the moveable pin 430 and the fixed pin 140 are parallel to one another. In various embodiments, the attachment portion 20 may be movable relative to the body portion 10 along a moveable pin travel path defined at least in part by the profile of at least one of a plurality of moveable pin grooves, as described herein. Further, in various configurations, the attachment portion 20 may be rotatable about a central axis of the moveable pin 430. For example, in various embodiments, the attachment portion 20 may have a range of motion of approximately 180 degrees such that the attachment portion 20 may rotate in either a clockwise or counterclockwise direction to an at least substantially horizontal position on either side of the body portion 10.

In various embodiments, the attachment portion 20 may comprise an internal eyelet area 410 defined by the eyelet 400. The attachment portion 20 may be configured to receive at least one attachable interface element, such as, for example, a hook or a carabiner, through the internal eyelet area 410 such that it may be secured to the eyelet 400. In various embodiments, the attachable interface element may be further attached to wearable retention device, such as, for example, a harness, that is secured to a person positioned on an at least substantially similar horizontal plane as that upon which the horizontal lifeline (e.g., the cable) is operably attached. As such, the attachment portion 20 may be configured to receive a pulling force from an attachable interface element attached thereto that may effectively pull the attachment portion 20 in a direction away from a cable to which the body portion 10 is attached (e.g., a falling direction). As described herein, such a force may cause the attachment portion 20, and thus the moveable pin 430, to move away from the body portion 10 along the plurality of moveable pin grooves. In various embodiments, a sufficiently large pulling force, as described herein, may result in a movement of the moveable pin 430 that may drive the moveable jaw 200 into a closed position so as to reinforce the connection of the shuttle apparatus to the cable.

A. Body Portion

Figure 2:
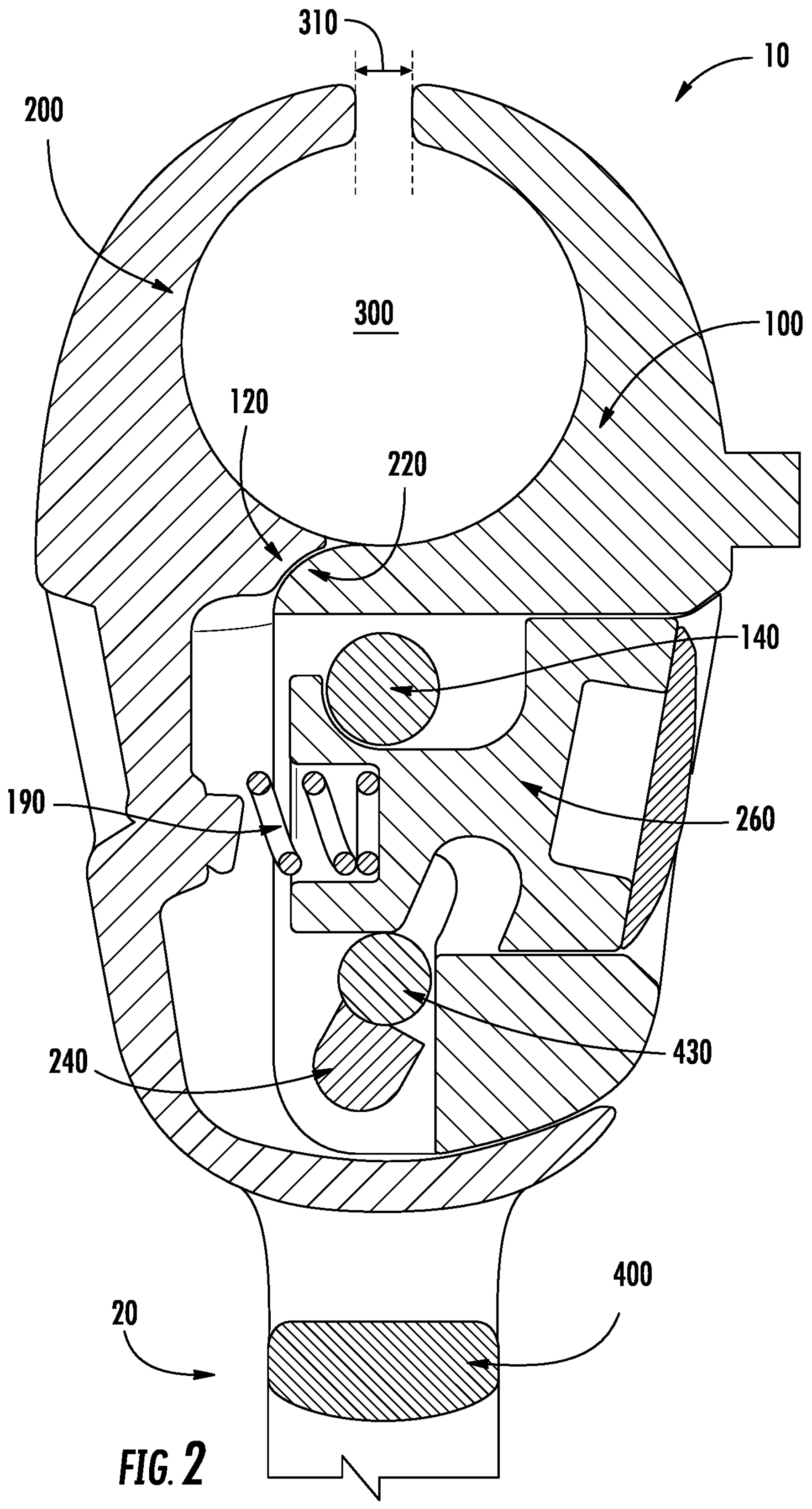
FIG. 2 illustrates a cross-sectional view of an exemplary apparatus as described herein.
Figure 3A:
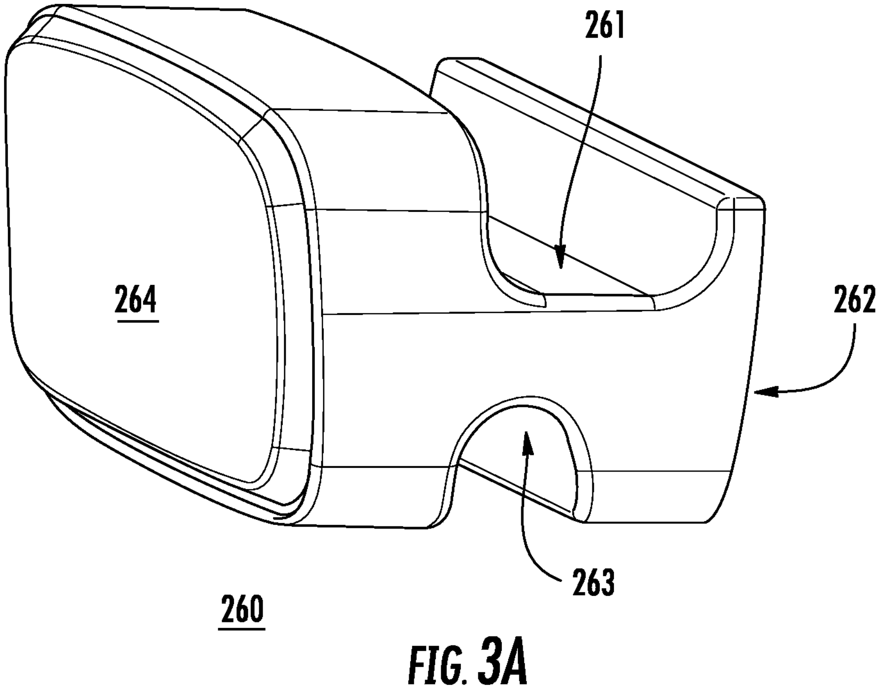
FIGS. 3A-3B illustrate an exemplary button element according to an exemplary embodiment.
Figure 3B:
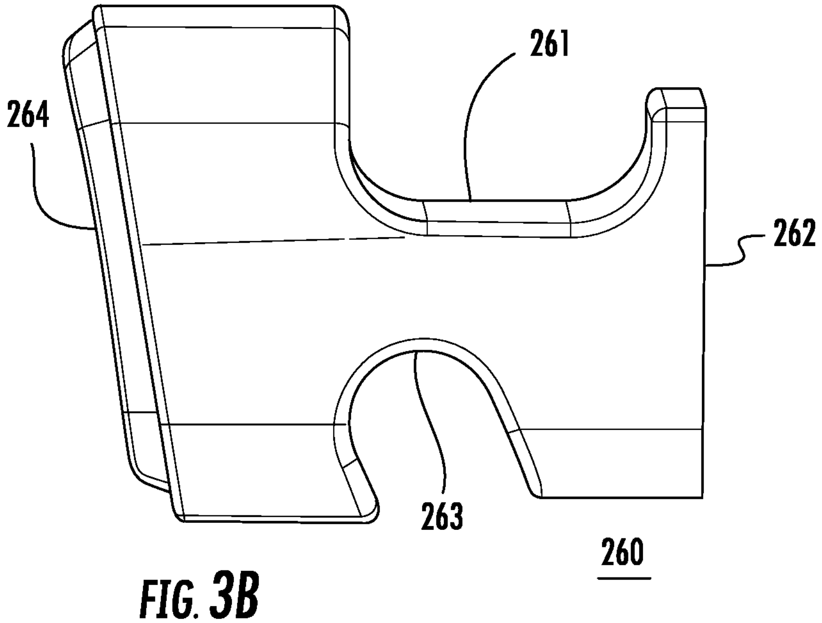

In particular, FIGS. 2-3B illustrate various views of components of an exemplary apparatus according to an embodiment discussed herein. In particular, FIG. 2 illustrates a cross-sectional view of an exemplary apparatus according to an embodiment discussed herein. As shown in FIG. 2, the exemplary shuttle apparatus is configured in a standard position which may correspond to an exemplary operational configuration of the shuttle apparatus wherein the shuttle apparatus maintains a cable channel gap 310 adjacent the cable channel 300 and between the fixed jaw 100 and the moveable jaw 200. For example, when in an exemplary standard position, the apparatus may comprise a cable channel gap 310 that is both sufficiently narrow to prevent the cable from unintentionally passing through the cable channel gap 310 and detaching from the shuttle apparatus, and sufficiently wide to allow a fixed jaw cable channel surface and a moveable jaw cable channel surface to travel on respective sides of the one or more intermediate brackets holding up the horizontal lifeline e. As such, the shuttle apparatus may maintain a secure connection to the cable while also enabling the smooth travel along lengths of the cable that are attached to an intermediate bracket secured to the elevated surface. In various embodiments, the shuttle apparatus may be selectively transitioned from a standard position to an open position, as described herein, wherein the open position comprises a position in which the moveable jaw 200 is rotated such that a moveable jaw cable channel surface and fixed jaw cable channel surface are sufficiently spaced apart (e.g., the cable channel gap is sufficiently wide enough) to allow a cable to pass therebetween and into the cable channel 300. Further, in various embodiments the shuttle apparatus may be configured in a closed position, wherein the moveable jaw is rotated about the fixed pin 140 toward the fixed jaw so as to effectively close the cable channel gap 310, thereby reinforcing secure connection of the shuttle apparatus to the cable. For example, the shuttle apparatus may be configured in a closed position in response to the attachment portion 20 experiencing a pulling force great enough to overcome the elastic forces of the at least one suspension element 240 as described herein (e.g., during a "fall event") and rotate the moveable jaw 200 towards the fixed jaw 100.

In various embodiments, button element 260 may be positioned within the body portion 10. As illustrated in FIG. 3A-3B, the button element 260 may comprise a top surface 261, a back surface, 262, a bottom surface, 263, and a button interface. As described herein, the button interface 264 may be configured to receive a pressing force, a top surface 261 may be configured to interact with a fixed pin 140, a bottom surface 263 may be configured to interact with a moveable pin 430, and a back surface 262, which may remain in contact with a button spring 190 configured to push against the back surface of the button element 260 such that the button element 260 can only retract into the body portion 10 upon receiving an external pushing force at the button interface 264 that is greater than the force being applied to back surface 262 of the button element 260. The top surface 261 of the button element 260 may be configured to interact with the fixed pin 140 so as to limit the linear displacement (e.g., retraction and/or compression) of the button element 260 caused by the spring force and/or an external pushing force.

As described herein, the button element 260 may be pressed by a user in order to initiate a process, such as a two-step process, used to move the shuttle apparatus from a standard position to an open position. For example, in order to move the fixed jaw 200 from the standard position to the open position, a user simultaneously presses the button element 260 into the body portion and applies a force to the attachment portion 20 in a substantially vertical direction (e.g., towards the body portion 10). As shown in FIGS. 2-3A, when the button element 260 is not compressed into the body portion 10, the bottom surface 263 of the button element 260 may act as an upper retaining wall that prevents the moveable pin 430 from moving vertically in a direction toward the fixed pin 140. In various embodiments, the bottom surface 263 of the button element 260 may comprise a slot configured to receive the moveable pin 430 upon an alignment of the slot with the moveable pin 430 (e.g., as a result of the button element 260 being pressed). In various embodiments, the slot defined by the bottom surface 263 of the button element 260 may be aligned with the moveable pin 430 when the button is in the fully comprised position (e.g., when the button element 260 is pressed against the fixed pin 140 such that it cannot be comprised any further into the body portion 10). The slot on the bottom surface 263 of the button may be configured such that when the moveable pin 430 is disposed within the slot and an additional vertical force is applied to the attachment portion 20 thereafter, the force may be transferred to the moveable jaw 200 so as to drive the rotational movement thereof. For example, the configuration of said slot may be such that force transferred from the attachment portion 20 through the button element 260 to the moveable jaw 200 may cause the moveable jaw 200 to rotate about the fixed pin 140 such that the shuttle apparatus is configured to transition to an open position.

In various embodiments, one or more properties of the button spring 190 may be varied in order to make the button element 260 either easier or harder to press (e.g., require less or more force to press). As a non-limiting example, the wire diameter of the spring may be reduced in order to decrease the stiffness of the spring, thereby making the button element 260 easier to compress by reducing the resistive force that must be overcome to compress the button element 260 into the body portion 10 of the shuttle apparatus. In various embodiments, certain elements of the shuttle apparatus may be positioned and/or configured so as to enable a user to simultaneously press the button element 260 and apply a substantially vertical force to the attachment portion 20 with a single hand. As a non-limiting example, the button element 260 may be intentionally arranged within a distance from the attachment portion 20 (e.g., the eyelet bracket 450) that is smaller than at least a majority of known corresponding hand dimensions. Further, the button interface 264 of the button element 260 may comprise a rectangular shape, rather an oval or circular shape, in order to increase the surface area of the interface. Additionally, as a non-limiting example, the button interface 164 may comprise a convex profile so as to discourage finger slippage from the button interface and direct the pressing force transferred from the button interface 164 to the rest of the button element 260 towards a single focal point.

As shown in FIG. 2, the fixed jaw 100 may comprise a fixed upper interface surface 120 that may run along at least a portion of the length of the fixed jaw 100 corresponding to the length of the moveable jaw 100. In various embodiments, the fixed upper interface surface 120 may comprise a profile corresponding to that of the moveable upper interface surface 220. The respective upper interface surfaces 120, 220 may be configured such that the moveable jaw 200 may rotate about the fixed pin 140 in either a clockwise or counter-clockwise direction without being inhibited by the fixed upper interior surface 120 and without creating any substantial gaps and/or surface plane discontinuities within the cable channel 300. For example, the fixed upper interface surface 120 and the moveable upper interface surface 220 may each comprise a curved surface, wherein a least a portion of the fixed upper interface surface 220 may comprise a rounded concave geometry and at least a portion of the fixed upper interface portion 120 corresponding thereto may comprise a rounded convex geometry comprising an at least substantially similar radius of curvature.

i. Fixed Jaw

Figure 4:
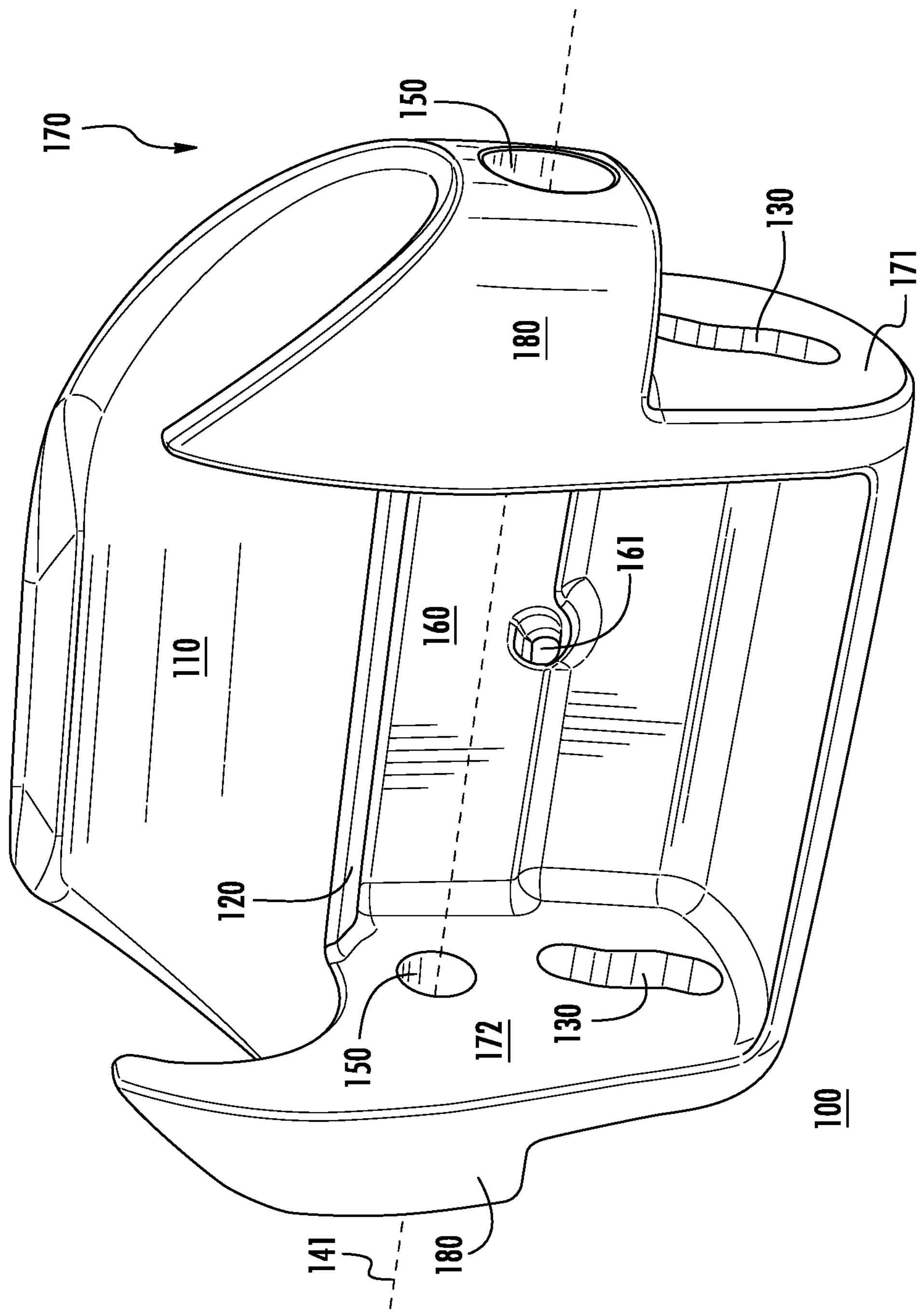
FIG. 4 illustrates a perspective view of an exemplary fixed jaw according to an embodiment.
Figure 5:
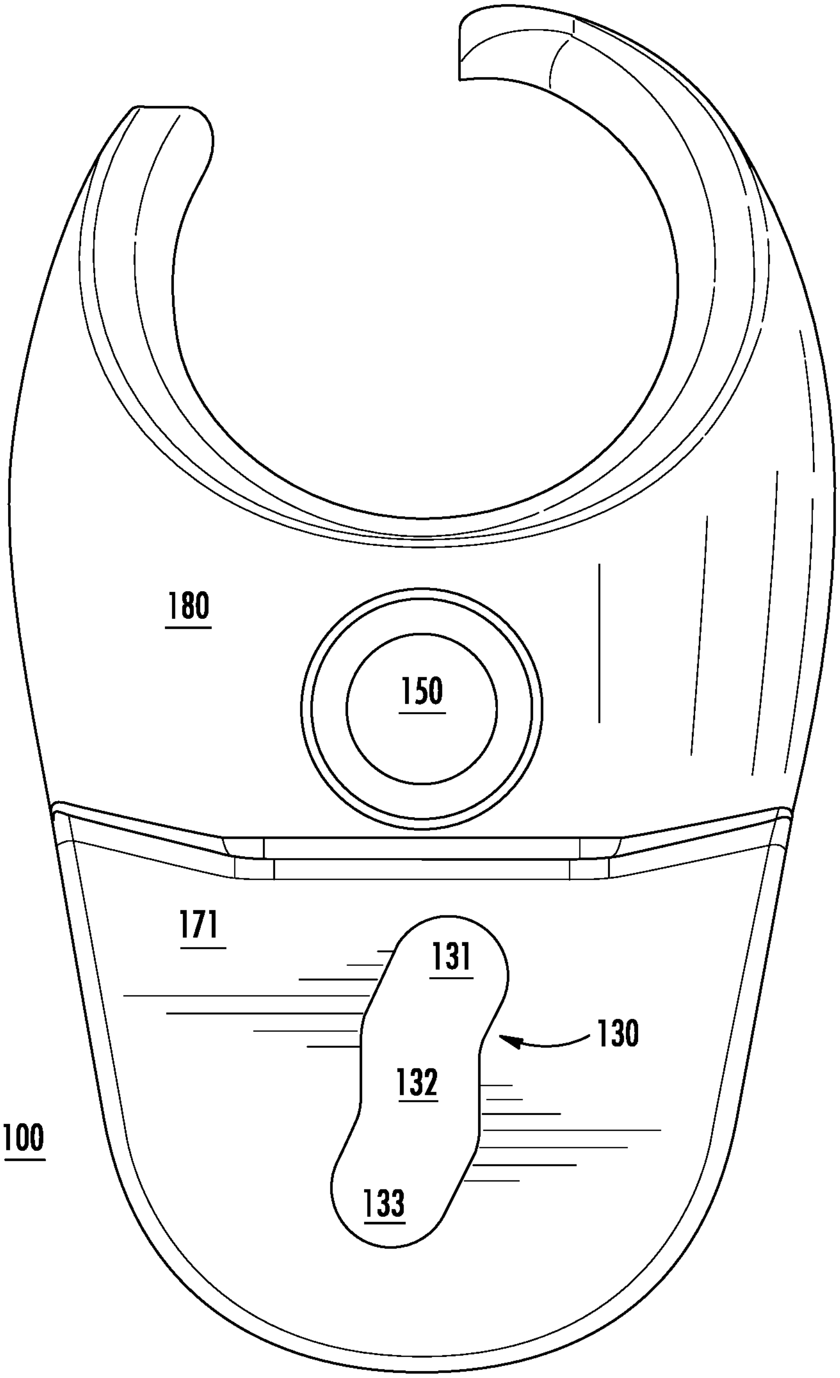
FIG. 5 illustrates a side view of an exemplary fixed jaw according to an embodiment.

FIGS. 4 and 5 illustrate exemplary fixed jaw 100 embodiments as discussed herein. As shown in FIG. 4, a fixed jaw 100 of an exemplary horizontal lifeline shuttle apparatus may comprise a fixed jaw cable channel surface 110 configured to define at least a portion of the cable channel as discussed herein. The fixed jaw 100 may comprise a fixed upper interface surface 120 comprising a profile, for example, defined by one or more curved features, that may correspond to that of a moveable upper interface surface of the moveable jaw. As described herein, the fixed upper interface surface 120 may be configured to nest at least substantially adjacent to the moveable upper interface surface so as to maintain an at least substantially smooth transition between the fixed jaw cable channel surface 110 and the moveable jaw cable channel surface. In various embodiments, the fixed upper interface surface 120 may be configured to allow for the unencumbered rotation of the moveable jaw about the fixed pin 140. Alternatively, in various embodiments, the moveable upper interface surface may contact the fixed upper interface surface 120 as it rotates about the fixed pin axis 141 such that the fixed upper interface surface 120 may at least partially direct the movement of the moveable jaw.

In various embodiments, the fixed jaw 100 may comprise a back wall 160 which may comprise a spring interface element 161. In various embodiments, the spring interface element 161 may be configured to interact with a button spring that may be positioned between the back wall 161 of the fixed jaw 100 and a back surface of a button element disposed within the body portion, as described herein. The spring interface element 161 may be configured to secure a button spring about a particular axis extending between the button element and the back wall 160 in a direction that is at least substantially perpendicular to one or both of the back surface of the button element and the back wall 160. The spring interface element 161 may mitigate the lateral movement of at least one end of the button spring about the surface of the back wall 160. Although exemplarily shown in FIG. 4 as a protrusion extending from the back wall 160 towards the interior of the fixed jaw 100, the spring interface element 161 may comprise any means for at least partially securing the position and/or restricting the lateral movement of a button spring, such as, for example, a fastener and/or a recessed groove corresponding to a diameter of the button spring and configured to receive one end of the button spring.

As illustrated in FIG. 4, the fixed jaw 100 may comprise two outer portions 170 respectively positioned on opposite ends of the fixed jaw 100. In various embodiments, an outer portion 170 of the fixed jaw 100 may comprise an outer sidewall 171, an inner sidewall 172, an outer shelf 180, a fixed pin aperture 150, and a moveable pin groove 130. In various embodiments, a fixed pin aperture 150 may be positioned within an outer shelf 180 of an outer portion 170. A fixed pin aperture 150 may comprise an opening through which at least a portion of a fixed pin may extend. In various embodiments, the fixed pin apertures 150 may comprise a rounded opening extending between an internal sidewall 172 and an outer surface of an outer shelf 180. For example, the two fixed pin apertures 150 of the two respective outer portions 170 may be coaxially arranged such that a substantially linear fixed pin may extend therebetween. In such a configuration, the central axis shared by the two fixed pin apertures 150 may define the fixed pin axis 141. In various embodiments, a fixed pin may be fixedly secured to a portion of an outer portion 170 such that the fixed pin axis 141 remains stationary relative to the other components of the fixed jaw 100. In various embodiments, a fixed pin disposed within one or more fixed pin apertures 150 may be configured to freely rotate within the one or more fixed pin apertures 150 about the fixed pin axis 141. Alternatively, the fixed pin may be rotationally secured within one or more of the outer portions 170 such that it is a static component. In various embodiments, one or more of the fixed pin apertures 150 may comprise a variable diameter. For example, where a fixed pin comprises a variable diameter, the fixed pin apertures 150 of the two outer portions 170 may each comprise a diameter that increases at least one location along the fixed pin axis between the corresponding inner sidewall 172 and the outer wall of the outer shelf 180 (e.g., such that the diameter of the fixed pin aperture 150 is larger at the outer surface of the outer shelf than it is at the inner sidewall 172).

As described herein, the fixed jaw 100 may further comprise at least one moveable pin grooves 130 disposed within an outer portion 170. A moveable pin groove 130 may comprise an opening through which at least a portion of a moveable pin may extend. As shown in FIG. 4, each of the moveable pin grooves 130 of the fixed jaw 100 may be positioned within a respective outer portion 170. For example, each of the moveable pin grooves may extend perpendicularly from an outer sidewall 171 to a corresponding inner sidewall 172. The moveable pin grooves 130 may be aligned with one another such that the position of each moveable pin groove 130 about its respective sidewall may mirror the position of the other moveable pin groove 130 about the sidewall in which it is disposed. Further, in various embodiments, the dimensions of each of the moveable pin grooves 130 may be at least substantially similar. In such a configuration, the moveable pin grooves 130 may be arranged such that at least a portion of a substantially linear moveable pin may extend therebetween. In various embodiments, as described herein, a moveable pin extending through the moveable pin grooves 130 may be configured to move along the length of the grooves. As such, the outer boundary of the moveable pin grooves 130 are configured to limit the motion of the moveable pin relative to the fixed jaw 100, such that the profile and configuration of the moveable pin grooves 130 at least partially define a range of motion of a moveable pin that extends through the grooves.

FIG. 5 illustrates a side view of a fixed jaw 100 according to one embodiment discussed herein. As shown in FIG. 5, the at least one fixed pin aperture 150 may be at least partially positioned within an outer shelf 180 of the fixed jaw 100. Further, as described herein, at least one of a plurality of moveable pin grooves 130 may be at least partially disposed at an outer sidewall 171 and may extend through to a corresponding inner sidewall in a direction perpendicular to the outer sidewall 171. In various embodiments, the at least one moveable pin groove 130 of the fixed jaw 100 may comprise an upper portion 131, a vertical intermediate portion 132, and a lower portion 133. In various embodiments, the vertical intermediate portion 132 may comprise an area of the moveable pin groove 130 that extends along a vertical axis and is defined by straight edges. For example, the length of the vertical intermediate portion 132 measured along the vertical axis may be greater than the diameter of a portion of a moveable pin extending therethrough. In various embodiments, the upper portion 131 may comprise an area of the moveable pin groove 130 positioned adjacent to and above the vertical intermediate portion 132, while the lower portion 133 may comprise an area of the moveable pin groove 130 positioned adjacent to and above the vertical intermediate portion 132. As shown in FIG. 5, both the upper portion 131 and the lower portion 133 of the moveable pin groove may 130 comprise an angular configuration such that each portion extends in a direction that is angled between 1 and 89 degrees from the vertical axis of the vertical intermediate portion 132. In various embodiments, one or both of the upper portion 131 and the lower portion 133 may be defined by at least one curved edge. Further, in various embodiments, the upper portion 131 and the lower portion 133 may extend from the vertical intermediate portion 132 in at least substantially opposite directions, each being configured to comprise the same angular trajectory along the sidewall relative to the vertical axis. Collectively, the upper portion 131, the vertical intermediate portion 132, and the lower portion 133 are arranged to define the shape of the moveable pin groove 130. In various embodiments, each moveable pin groove 130 of the fixed jaw 100 may generally comprise a serpentine or "S-shaped" groove profile having an at least substantially straight vertical intermediate portion 132. In certain embodiments, the vertical axis along which the vertical intermediate portion 132 extends may be at least substantially coplanar with the fixed pin axis.

Alternatively or additionally, other groove profiles may be chosen. For example, a crescent shaped groove profile, an angled groove profile, and or other configurations of angles and/or curves may be used in a groove profile.

ii. Moveable Jaw

Figure 6:
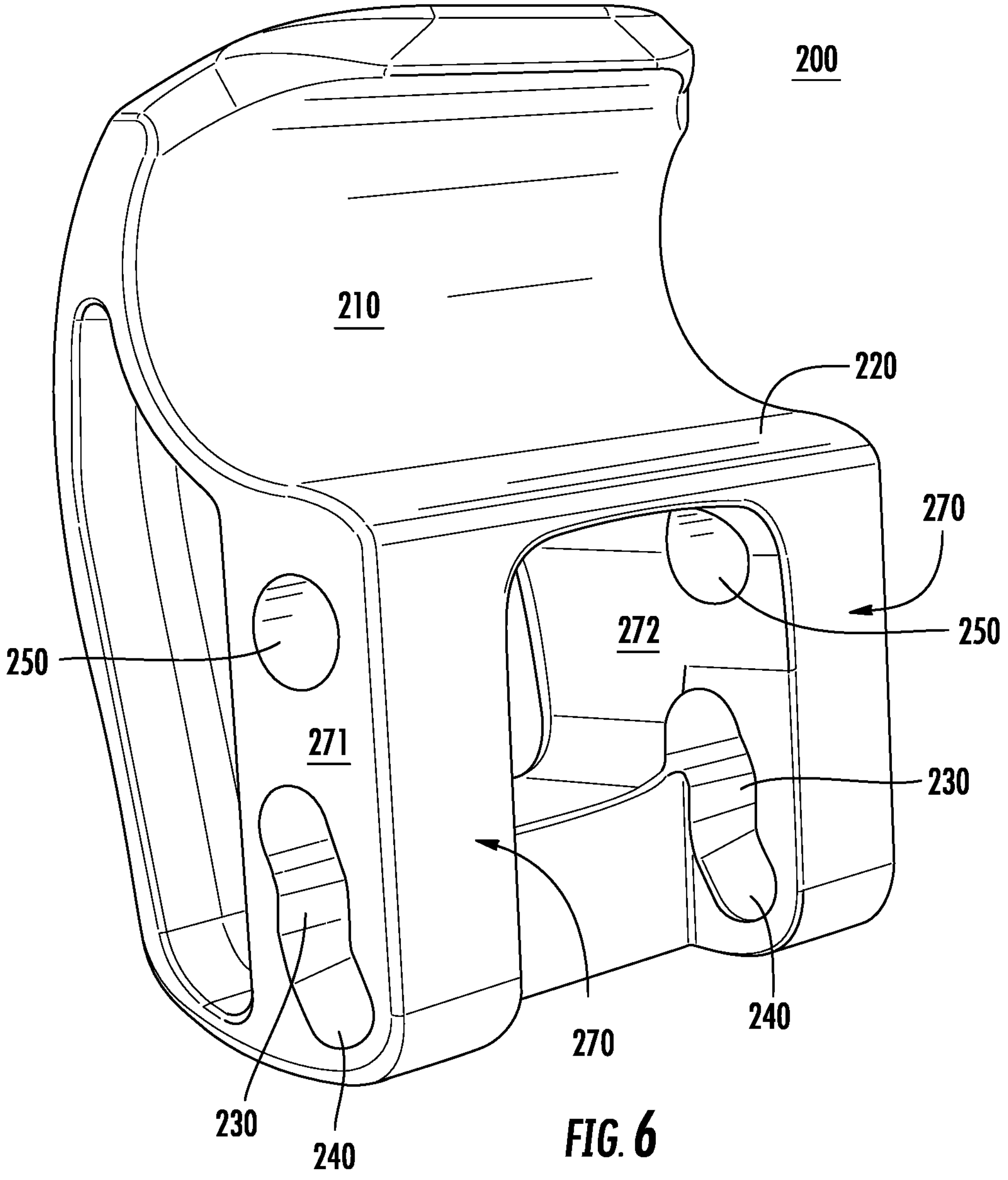
FIG. 6 illustrates a perspective view of an exemplary fixed jaw according to an embodiment.
Figure 7:
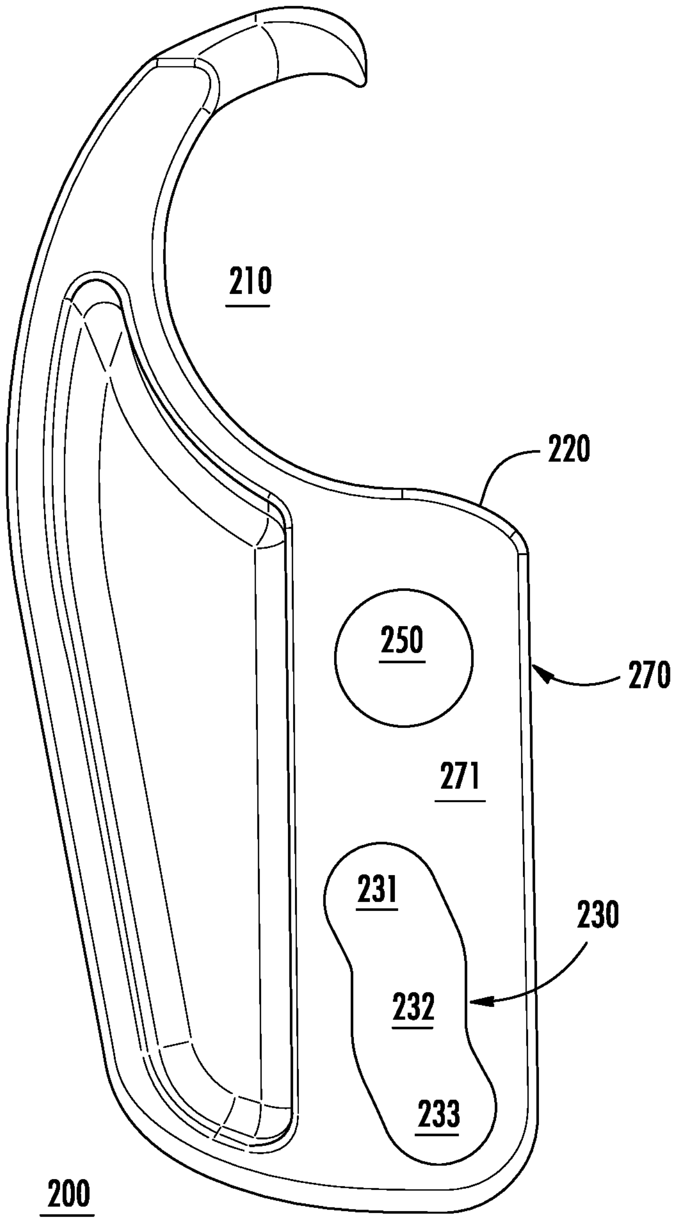
FIG. 7 illustrates a side view of an exemplary fixed jaw according to an embodiment.

FIGS. 6 and 7 illustrate exemplary moveable jaw 200 embodiments as discussed herein. As shown in FIG. 6, a moveable jaw 200 of an exemplary horizontal lifeline shuttle apparatus may comprise a moveable jaw cable channel surface 210 configured to define at least a portion of the cable channel as discussed herein. The moveable jaw 200 may comprise a moveable upper interface surface 220 comprising a profile, for example, defined by one or more curved features, that may correspond to that of a fixed upper interface surface, as discussed herein. As described herein, the moveable upper interface surface 220 may be configured to nest at least substantially adjacent to the fixed upper interface surface so as to maintain an at least substantially smooth transition between the fixed jaw cable channel surface and the moveable jaw cable channel surface 220. In various embodiments, the moveable upper interface surface 220 may be configured to rotate about a fixed pin axis without engaging the fixed upper interface surface of the fixed jaw. Alternatively, in various embodiments, the moveable upper interface surface 220 may contact the fixed upper interface surface as it rotates about the fixed pin axis such that the fixed upper interface surface may at least partially direct the movement of the moveable jaw 200.

As illustrated in FIG. 6, the moveable jaw 200 may comprise two sidewall portions 270 respectively positioned on opposite ends of the moveable jaw 200. In various embodiments, a sidewall portion 270 of the moveable jaw 200 may comprise an outer sidewall 271, an inner sidewall 272, a fixed pin aperture 250, and a moveable pin groove 230. In various embodiments, a fixed pin aperture 250 may comprise an opening through which at least a portion of a fixed pin may extend. In various embodiments, the fixed pin apertures 250 may comprise a rounded opening extending between an outer sidewall 271 and an internal sidewall 272. For example, the two fixed pin apertures 250 of the two respective sidewall portions 270 may be coaxially arranged such that a substantially linear fixed pin may extend therebetween. In such a configuration, the central axis shared by the two fixed pin apertures 252 may define the fixed pin axis. In various embodiments, the two fixed pin apertures 250 disposed within the respective sidewall portions 270 of the moveable jaw 200 may be at least substantially coaxial with the fixed pin apertures of the fixed jaw. For example, in an exemplary embodiment wherein the outer sidewalls 272 of the moveable jaw 200 are respectively positioned directly adjacent an inner sidewall of the fixed jaw, each of the fixed pin apertures 250 of the moveable jaw 200 may be coaxially aligned with each of the fixed pin apertures of the fixed jaw. In such a circumstance, the respective fixed pin apertures 250 of the moveable jaw 200 may be positioned at least substantially adjacent to the fixed pin aperture of the fixed jaw disposed within an adjacent outer portion thereof. In various embodiments, as described herein, the moveable jaw 200 may be configured to rotate about a fixed pin disposed within the one or more fixed pin apertures 250

As described herein, the moveable jaw 200 may further comprise at least one moveable pin grooves 230 disposed within a sidewall portion 270. A moveable pin groove 230 may comprise an opening through which at least a portion of a moveable pin may extend. As shown in FIG. 6, each of the moveable pin grooves 230 of the moveable jaw 200 may be positioned within a respective sidewall portion 270. For example, each of the moveable pin grooves may extend perpendicularly from an outer sidewall 271 to a corresponding inner sidewall 272 of the same sidewall portion 270. The moveable pin grooves 230 of the moveable jaw 200 may be aligned with one another such that the position of each moveable pin groove 230 about its respective sidewall portion 270 may mirror the position of the other moveable pin groove 230 about the sidewall portion 270 in which it is disposed. Further, in various embodiments, the dimensions of each of the moveable pin grooves 230 may be at least substantially similar. In such a configuration, the moveable pin grooves 230 may be arranged such that at least a portion of a substantially linear moveable pin may extend therebetween. In various embodiments, as described herein, a moveable pin extending through the moveable pin grooves 230 may be configured to move along the length of the grooves. As such, the outer boundary of the moveable pin grooves 230 are configured to limit the motion of the moveable pin relative to the moveable jaw 200, such that the profile and configuration of the moveable pin grooves 230 at least partially define a range of motion of a moveable pin that extends through each of the grooves.

In various embodiments, the moveable jaw 200 may further comprise at least one suspension element 240 respectively positioned within each of the moveable pin grooves 230 of the moveable jaw 200. For example, the suspension elements 240 may be positioned within each of the moveable pin grooves 230 and in between a portion of a moveable pin extending through the moveable pin grooves 230 and the eyelet of the attachment portion. The at least one suspension elements may be configured to provide a resistance force against a portion of a moveable pin present within the moveable pin grooves 230 as the moveable pin is being pulled in a downward direction (e.g., away from the fixed pin aperture 250) by the attachment portion, as described herein. In various embodiments, a suspension element 240 may comprise an element and/or material having sufficient material properties such that it may be compressed by the pulling forces transmitted from the attachment portion to the moveable pin that are great enough to indicate a “fall event,” yet such that it may resist being suppressed by similarly transmitted pulling forces that are not great enough to indicate a “fall event,” as described herein. For example, the suspension element 240 may comprise an elastomer element or a spring. Further, in various embodiments, wherein the shuttle apparatus is configured in a standard position, the suppression element may be configured to provide support to the moveable pin such that it may remain disposed within a vertical intermediate position, as described herein. As shown in FIG. 6, the suppression element may be configured to fit between an inner sidewall 272 and an outer sidewall 271 (e.g., within the moveable pin groove) and may comprise a shape that may at least substantially correspond to a portion of the moveable pin groove 230.

FIG. 7 illustrates a side view of a moveable jaw 200 according to an example embodiment discussed herein. As shown in FIG. 7, the at least one fixed pin aperture 250 may be at least partially positioned within a sidewall portion 270 of the moveable jaw 200. Further, as described herein, at least one of a plurality of moveable pin grooves 230 may be at least partially disposed at an outer sidewall 271 and may extend through to the inner sidewall of the same sidewall portion 270 in a direction perpendicular to the outer sidewall 271. In various embodiments, the at least one moveable pin groove 230 of the moveable jaw 200 may comprise an upper portion 231, a vertical intermediate portion 232, and a lower portion 233. In various embodiments, the upper portion 231, the vertical intermediate portion 232, and the lower portion 233 may be at least substantially similarly configured to the upper portion, vertical intermediate portion, and lower portion, respectively, of the moveable pin grooves of the fixed jaw, as described herein. For example, the vertical intermediate portion 232 may comprise an area of the moveable pin groove 230 that extends along a vertical axis and is defined by straight edges. In certain embodiments, the vertical axis along which the vertical intermediate portion 232 extends may be at least substantially coplanar with the fixed pin axis.

In various embodiments, the upper portion 231 may comprise an area of the moveable pin groove 230 positioned adjacent to and above the vertical intermediate portion 232, while the lower portion 233 may comprise an area of the moveable pin groove 230 positioned adjacent to and above the vertical intermediate portion 232. As shown in FIG. 7, both the upper portion 231 and the lower portion 233 of the moveable pin groove 230 may comprise an angular configuration such that each portion extends in a direction that is angled between 1 and 89 degrees from the vertical axis of the vertical intermediate portion 232. In various embodiments, one or both of the upper portion 231 and the lower portion 233 may be defined by at least one curved edge. Further, in various embodiments, the upper portion 231 and the lower portion 233 may extend from the vertical intermediate portion 232 in at least substantially opposite directions, each being configured to comprise the same angular trajectory along the sidewall portion 270 relative to the vertical axis. Collectively, the upper portion 231, the vertical intermediate portion 232, and the lower portion 233 are arranged to define the shape of the moveable pin groove 230. In various embodiments, each moveable pin groove 230 of the moveable jaw 200 may generally comprise a serpentine or "S-shaped" groove profile having an at least substantially straight vertical intermediate portion 232.

As described herein, in various embodiments, the serpentine or "S-shaped" groove profile of the moveable pin grooves 230 of the moveable jaw 200 may be at least substantially similar to the groove profile (e.g., groove shape) of the moveable pin grooves of the fixed jaw, but may be arranged within the respective sidewall portions 270 such that each moveable pin groove 230 embodies a mirrored configuration transposed about the central vertical axis along which the vertical intermediate portion extends, as described in further detail herein.

Further, as described herein, in various embodiments, at least a portion of the lower portion 233 of the moveable pin groove 230 may be configured to house a suppression member, as described herein.

Figure 8:
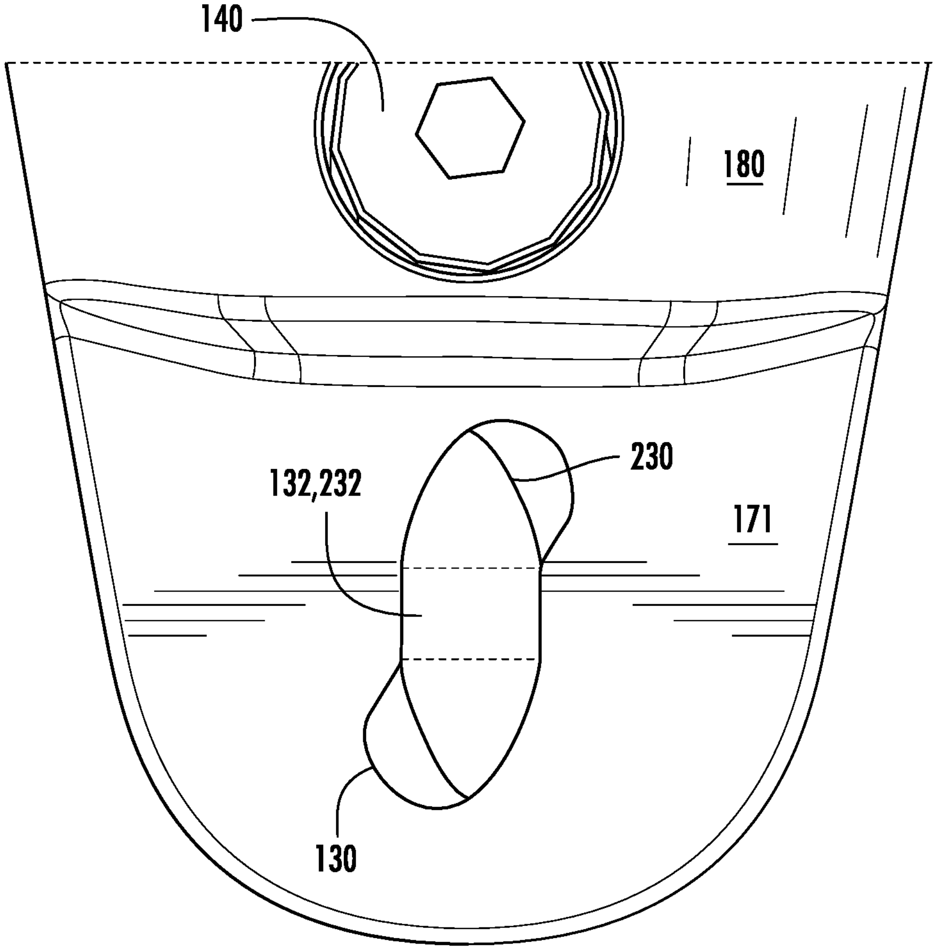
FIG. 8 illustrates a side sectional view of various components of an exemplary apparatus according to an embodiment.

FIG. 8 illustrates a side sectional view of various components of an exemplary apparatus according to an embodiment. In particular, FIG. 8 illustrates the moveable pin grooves 130, 230 of both the fixed jaw and the moveable from a point of view positioned external to the shuttle apparatus and along a moveable pin axis. As shown, in various embodiments, the moveable pin groove 130 of the fixed jaw may be disposed within an outer portion of the fixed jaw, extending between and outer sidewall 171 and an inner sidewall. Further, the moveable pin groove 230 of the moveable jaw may be disposed within a sidewall portion of the moveable jaw, extending between an outer sidewall and an inner sidewall thereof. In various embodiments, the inner sidewalls of the fixed jaw may be respectively positioned directly adjacent the outer sidewalls of the moveable jaw, such that the moveable pin groove 230 of the moveable jaw may be positioned inside the moveable pin groove 130 of the fixed jaw relative to the body of the shuttle apparatus.

As described herein, in various embodiments, the moveable pin grooves of the fixed jaw and the moveable jaw, 130, 230 may comprise an at least substantially similar serpentine or "S-shaped" groove profile. Critically, in various embodiments, the moveable pin grooves of the moveable jaw 230 may be arranged within the respective sidewall portions such that each moveable pin groove 230 may embody a mirrored configuration of the moveable pin groove 130 of the fixed jaw transposed about a central vertical axis along which the vertical intermediate portions 132, 232 of each of the plurality of moveable pin grooves extends. For example, the moveable pin grooves of the fixed jaw 130 may be aligned with the moveable pin grooves of the moveable jaw 230 such that the vertical intermediate portion 232 of the moveable pin groove 230 of the moveable jaw 200 may be coaxially aligned with each of the vertical intermediate portions 132 of the moveable pin grooves 130 of the fixed jaw. In various embodiments, the vertical intermediate portion 232 of the moveable pin groove 230 of the moveable jaw 200 may each comprise at least substantially the same cross-sectional area as vertical intermediate portion 132 of the moveable pin groove 130 of the fixed jaw. In various embodiments, each moveable pin groove 230 of the moveable jaw 200 and an adjacently positioned moveable pin groove 130 of the fixed jaw may collectively define a crossing groove pattern configured to overlap at the respective coaxial vertical intermediate portions 132, 232, as shown in FIG. 8. In various embodiments, the overlapping and coaxial vertical intermediate portions 132, 232 of the fixed jaw and moveable jaw moveable pin grooves 130, 230 allow for a moveable pin configured to extend through each of the moveable pin grooves 130, 230 to naturally settle in a nominal position within the vertical intermediate portion 132, 232 of each of the moveable pin grooves 130, 230. For example, the multi-layered crossing configuration of the respective upper portions and lower portions of the moveable pin grooves, in combination with the vertical configuration of the vertical intermediate portions 132, 232, may functionally prevent a moveable pin disposed within the vertical intermediate portions 132, 232 from being vertically displaced without the application of external force. As described here, the vertical positioning of the moveable pin within the moveable pin grooves 130, 230 may, at least in part, operatively control the rotation movement of the moveable jaw, and thus, the configuration of the shuttle apparatus. As such, in an embodiment wherein the moveable pin is misaligned (e.g., the moveable pin axis is undesirably raised) due, in part, to manufacturing variability, the moveable jaw may rotate such that the shuttle apparatus may move at least away from a standard position towards either an open or closed position, depending on the direction of the error. For example, such an error may result in the cable channel gap widening to such an extent that a cable retained therein may get wedged between the moveable jaw and the fixed jaw, reducing the ability of the shuttle apparatus to smoothly glide along the cable in a manner that is comfortable to a user. As designed, the dual, mirrored, "S-shaped" moveable pin grooves 130, 230 of an exemplary embodiment described herein, each comprising a vertical intermediate portion 132, 232, reduce the risk of misalignment and corresponding error by providing a nominal position along a vertical axis in which a moveable pin may naturally settle, thereby mitigating the effects of production variability, in some examples.

iii. Exemplary Fixed Pin and Moveable Pin Configurations

Figure 9:
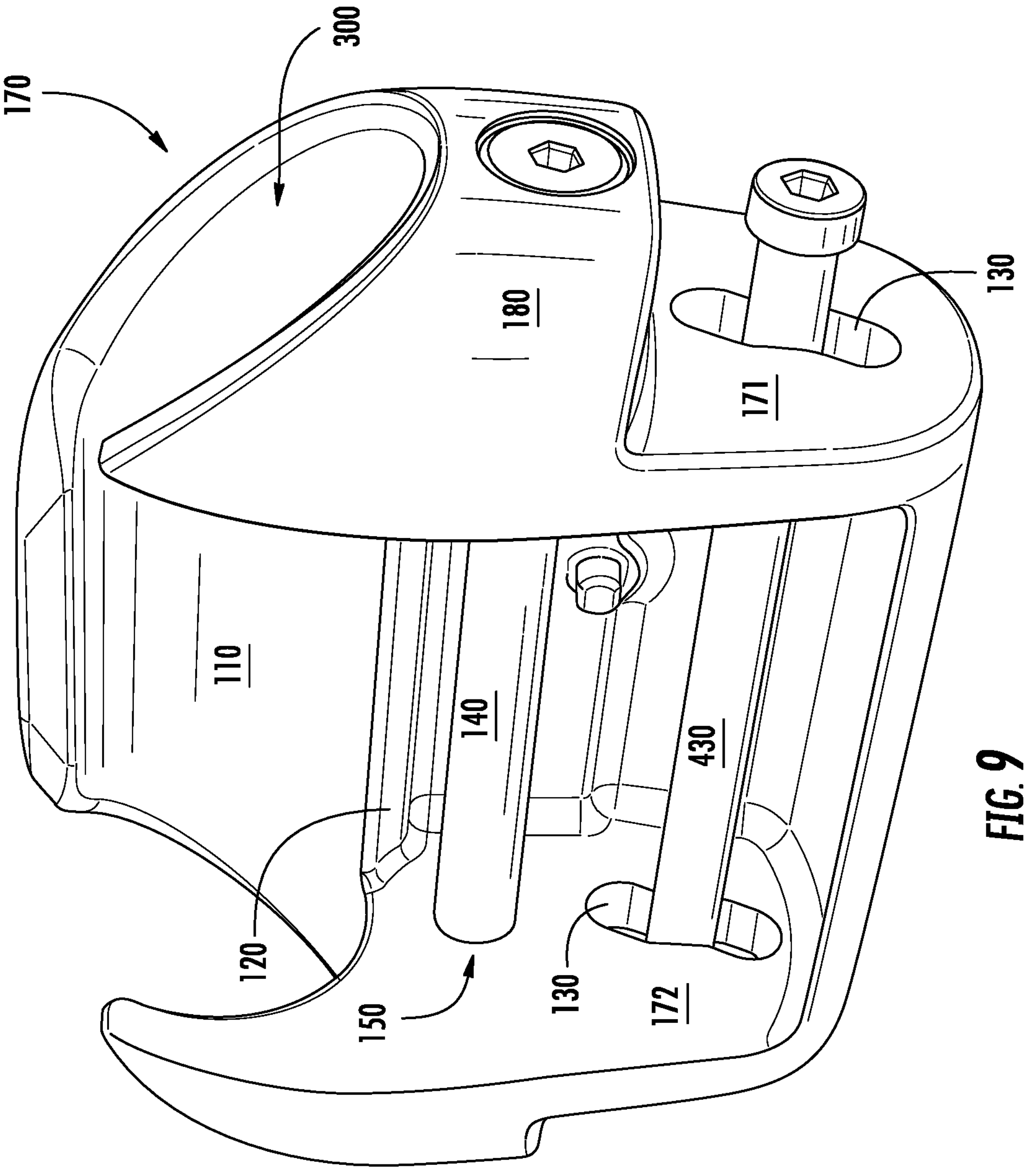
FIG. 9 illustrates a side view of various components of an exemplary apparatus according to an embodiment.
Figure 10:
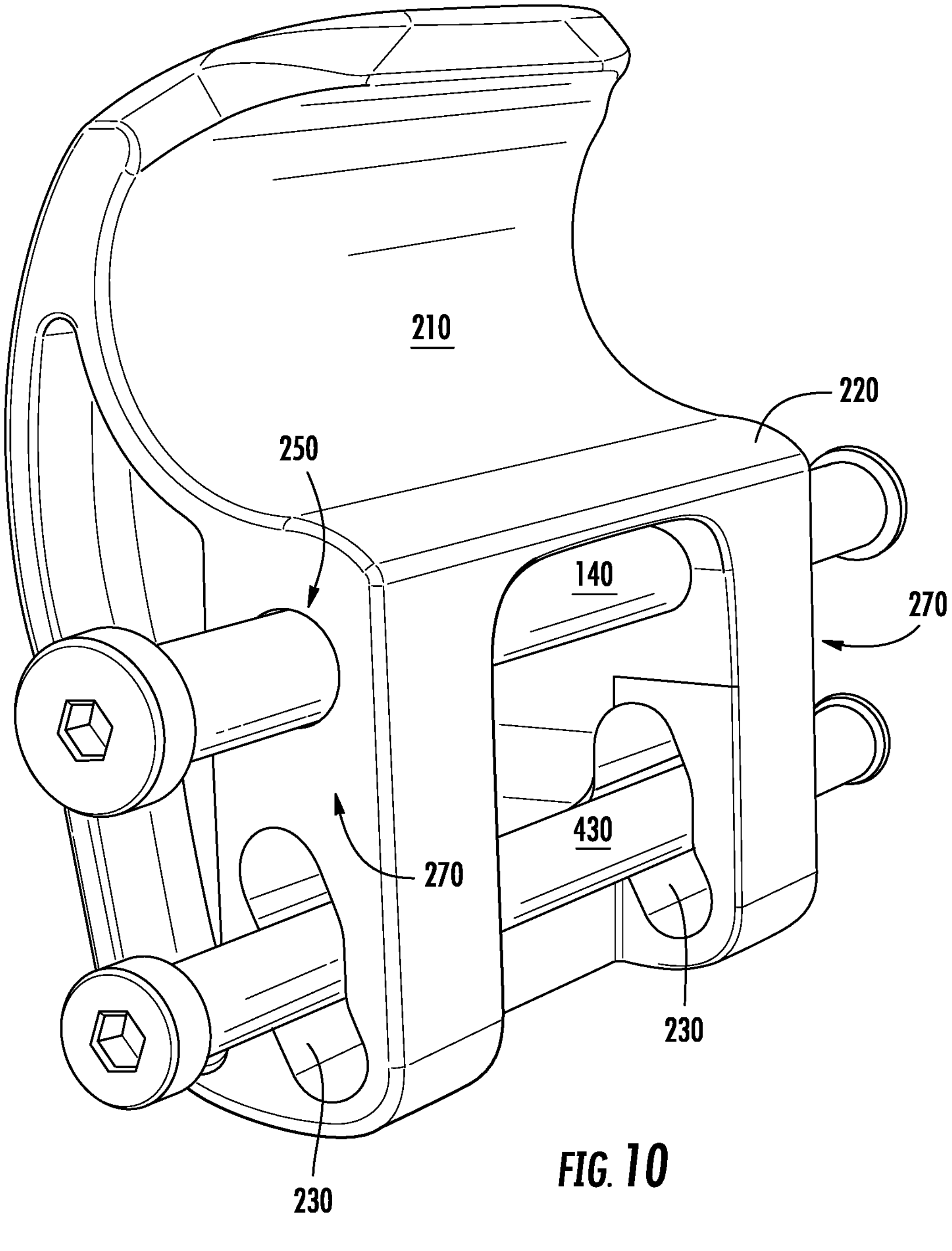
FIG. 10 illustrates a side view of various components of an exemplary apparatus according to an embodiment.

FIGS. 9-10 illustrate various components of the body portion and a moveable pin of an exemplary shuttle apparatus that is configured in a standard position. FIG. 9 illustrates a moveable pin 430 and a fixed pin 140 positioned within the exemplary fixed jaw 100 embodiment described herein with respect to FIGS. 3 and 4. As discussed herein, the fixed pin 140 may be configured to extend between the two fixed pin apertures 150 of the two respective outer portions 170. In various embodiments, the two opposite ends of the fixed pin 140 may be respectively secured within the two outer shelves 180 of the fixed jaw 100 so as to prevent lateral movement of the fixed pin 140 along a fixed pin axis. In various embodiments, the fixed pin 140 may be configured to freely rotate within the one or more fixed pin apertures 150 about the fixed pin axis. Alternatively, the fixed pin 140 may be rotationally secured within one or more of the outer portions 170 such that it comprises a fully static component of the shuttle apparatus.

Further, as shown in FIG. 9, moveable pin 430 may extend between the two moveable pin grooves 130 respectively positioned within the two outer portions 170 of the fixed jaw. In various embodiments, the moveable pin 430 may be configured to extend through each of the two moveable pin grooves 130 and beyond the outer sidewalls 171 of the outer portions 170, such that it may be fixedly secured to an arm of an attachment portion, as described herein. As shown, the moveable pin grooves 130 comprise a vertical intermediate portion and a generally "S-shaped" groove profile. In such an exemplary configuration, and wherein the shuttle apparatus is in the standard position, the moveable pin 430 may be positioned in a nominal position such that it extends between the vertical intermediate portions of the respective moveable pin grooves 130.

FIG. 10 illustrates a moveable pin 430 and a fixed pin 140 positioned within the exemplary moveable jaw 200 embodiment described herein with respect to FIGS. 5 and 6. As discussed herein, the fixed pin 140 may be configured to extend between the two fixed pin apertures 150 of the two respective sidewall portions 270. In various embodiments, the fixed pin 140 may extend between the two fixed pin apertures 250 respectively positioned within the two sidewall portions 270 of the moveable jaw. In various embodiments, the fixed pin 140 may be configured to extend beyond the outer sidewalls 271 of the sidewall portions 270, such that the fixed pin 140 may further extend into the side portions of the fixed jaw, where it may be fixedly secured, as described herein. In various embodiments, the fixed pin 140 may be configured to freely rotate within the one or more fixed pin apertures 250 about the fixed pin axis. Alternatively, the fixed pin 140 may be rotationally secured within the fixed jaw such that it comprises a fully static component of the shuttle apparatus. In various embodiments, as described herein, the moveable jaw may be configured to rotate about the fixed pin 141.

Further, as shown in FIG. 10, moveable pin 430 may extend between the two moveable pin grooves 230 respectively positioned within the two sidewall portions 270 of the moveable jaw. In various embodiments, the moveable pin 430 may be configured to extend through each of the two moveable pin grooves 230 and beyond the outer sidewalls 271 of the sidewall portions 270, such that it may be fixedly secured to one or more arms of an attachment portion, as described herein. As shown, the moveable pin grooves 230 comprise a vertical intermediate portion and a generally "S-shaped" groove profile. In such an exemplary configuration, and wherein the shuttle apparatus is in the standard position, the moveable pin 430 may be positioned in a nominal position such that it extends between the vertical intermediate portions of the respective moveable pin grooves 230.

B. Attachment Portion

Figure 11A:
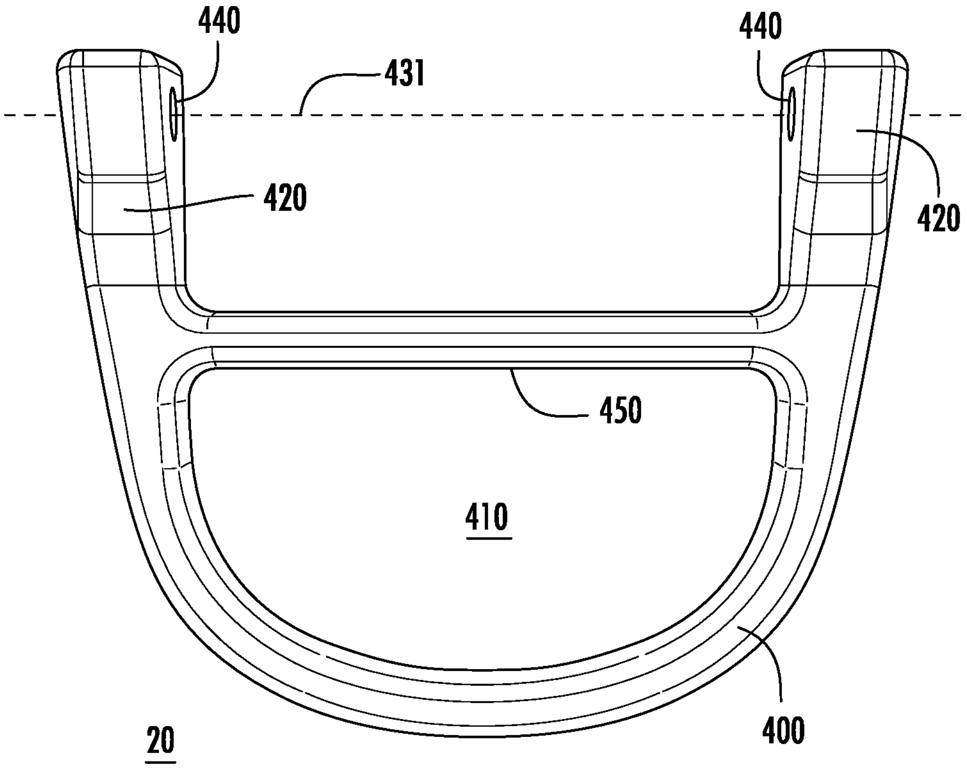
FIGS. 11A-11B illustrate an exemplary attachment portion according to an exemplary embodiment.
Figure 11B:
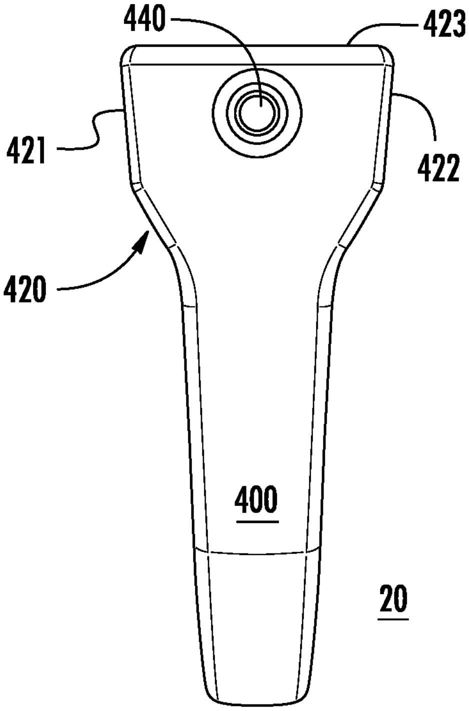

FIGS. 11A-11B illustrate an exemplary attachment portion according to an exemplary embodiment. As shown in FIGS. 11A and 11B, the horizontal lifeline shuttle apparatus may comprise an attachment portion 20. In various embodiments, the attachment portion 20 may comprise an eyelet 400, an internal eyelet area 410, two opposite arms 420, at least one moveable pin aperture 440, and a bracket 450.

In various embodiments, the attachment portion 20 may comprise an internal eyelet area 410 defined by the eyelet 400. The attachment portion 20 may be configured to receive at least one attachable interface element, such as, for example, a hook or a carabiner, through the internal eyelet area 410 such that it may be secured to the eyelet 400. In various embodiments, the attachment portion 20 may be configured to receive a pulling force from an attachable interface element attached thereto that may effectively pull the attachment portion 20 in a direction away from a cable to which a body portion of the shuttle apparatus is attached.

In various embodiments, the attachment portion 20 may comprise two opposite arms 420. As shown in FIGS. 11A-11B, the each of the arms 420 of the attachment portion may be configured to extend directionally outward from an eyelet 400. In various embodiments, an arm 420 may comprise a front surface 421, a back surface 422, and a top surface 423. Further, in various embodiments, each of the two opposite arms 420 may comprise a moveable pin aperture 440. In various embodiments, a moveable pin aperture 420 may comprise an opening through which at least a portion of a moveable pin may extend. For example, the two moveable pin apertures 440 of the two respective arms 420 may be coaxially arranged such that a substantially linear moveable pin may extend therebetween. In such a configuration, the central axis shared by the two moveable pin apertures may define the moveable pin axis 431. In various embodiments, a moveable pin may be fixedly secured to a portion of an arm 420 such that the moveable pin axis 431 may remain stationary relative to the other components of the attachment portion 20. As described herein, the attachment portion 20 may be rotatable about a moveable pin axis 431. For example, in various embodiments, the attachment portion 20 may have a range of motion of approximately 180 degrees such that the attachment portion 20 may rotate in either a clockwise or counterclockwise direction to an at least substantially horizontal position on either side of the body portion.

In various embodiments the attachment portion may further comprise a bracket 450. The bracket may be configured to extend across an exemplary attachment portion 20 in a direction substantially parallel the moveable pin axis. In various embodiments, the bracket may be configured to act as a physical barrier to prevent or otherwise reduce unwarranted interaction with the button element. For example, in a configuration wherein the attachment portion 20 is rotated 90 degrees about the moveable pin axis 431 such that the eyelet 400 is positioned on the same side of the shuttle apparatus as the button element, the bracket 450 may act as a physical barrier between an attachable interface element secured to the eyelet and the button interface. Further, in various embodiments, the bracket 450 may be configured to facilitate the unlocking of the dual-locking mechanism with a single hand, as described herein. For example, the bracket 450 maybe positioned relatively proximate to the button interface and may be operatively connected to the rest of the attachment portion 20 such that a force applied to the bracket 450 may be transferred to the moveable pin. The proximity of the bracket 450 to the button interface allows one to apply force to the attachment portion 20 while being able to reach the button interface with at least one finger of the same hand.

Figure 12:
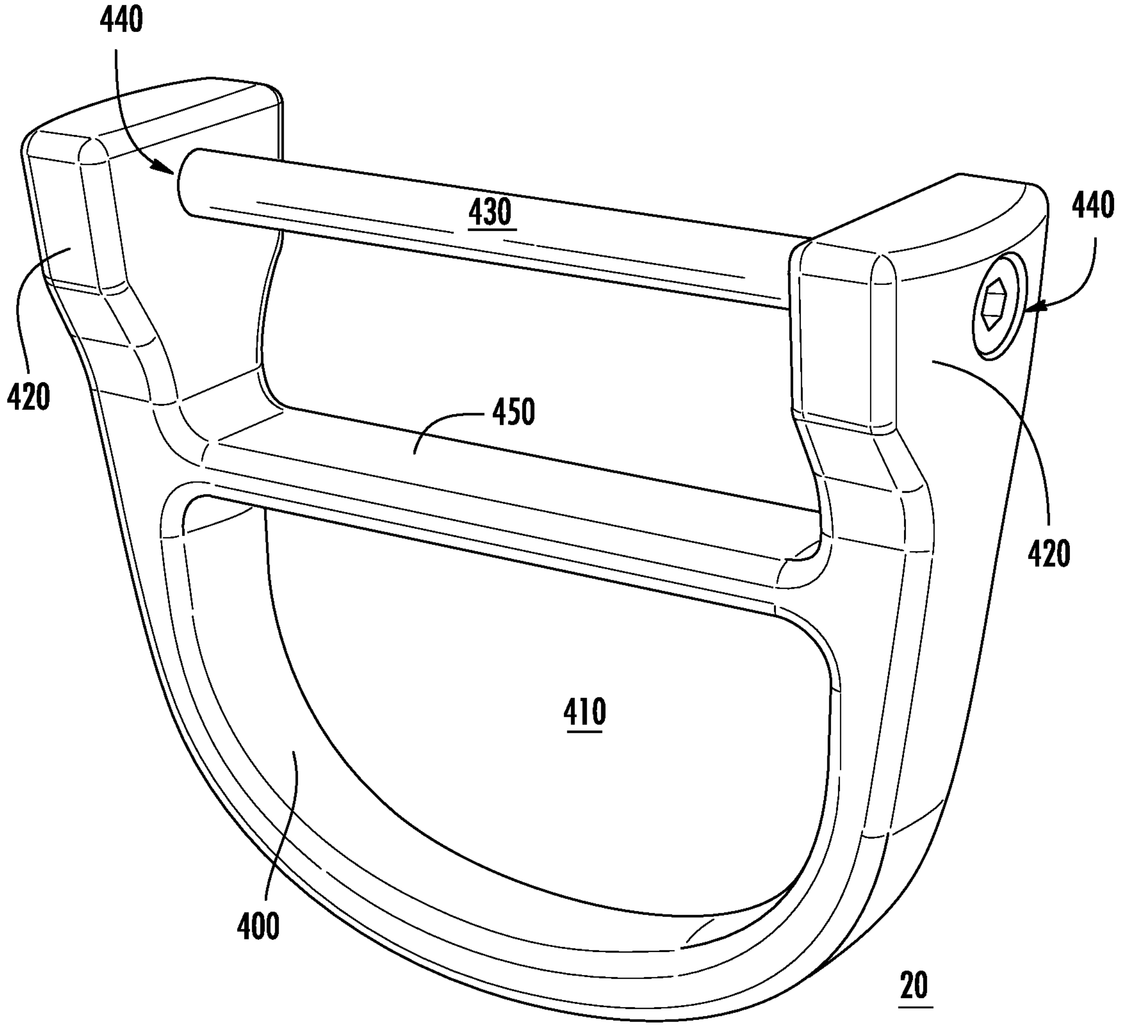
FIG. 12 illustrates a perspective view of an exemplary attachment portion as described herein.

FIG. 12 illustrates an exemplary attachment portion according to an example embodiment described herein. As shown in FIG. 12, a moveable pin 430 may be fixedly secured to a portion of each of the two opposite arms 420 such that the moveable pin 430 may extend between the two opposite arms 420 of the attachment portion 20 along the moveable pin axis 431. In various embodiments, one or more of the moveable pin apertures 440 may comprise a variable diameter. For example, where the moveable pin 431 comprises a variable diameter, the moveable pin apertures 440 of the two opposite arms 420 may each comprise a diameter that increases at least one location along the moveable pin axis along the depth of an arm 420 (e.g., such that the diameter of the moveable pin aperture 440 is larger at an outer surface of the arm 420 than it is at an inner surface).

C. Exemplary Shuttle Apparatus Configurations

Figure 13:
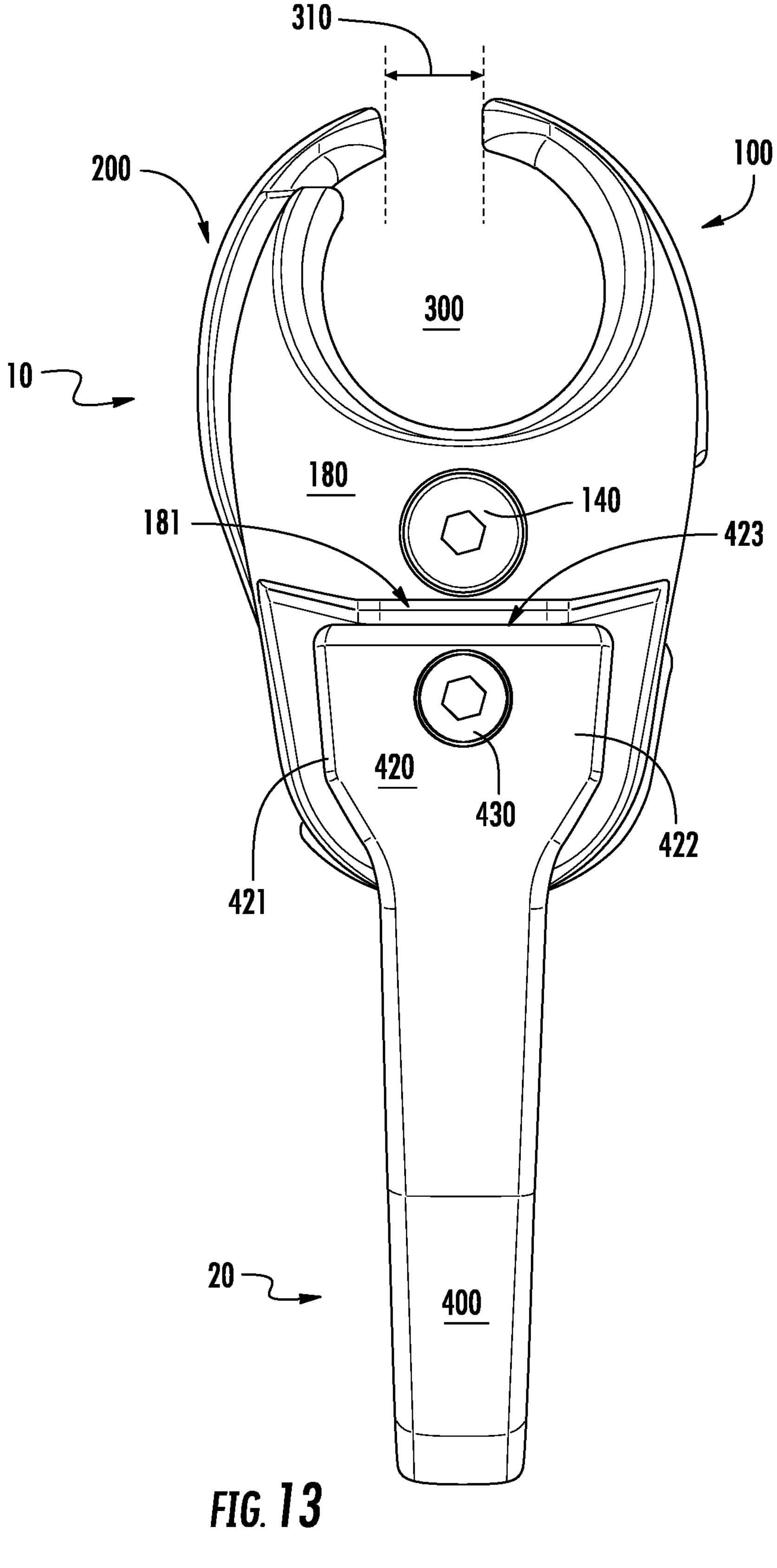
FIG. 13 illustrates a side view of various components of an exemplary apparatus according to an embodiment.

FIG. 13 illustrates a side view of various components of an exemplary apparatus according to an embodiment. In particular, FIG. 13 shows an exemplary shuttle apparatus in an open position, as described herein. In various embodiments, the shuttle apparatus may be selectively transitioned from a standard position to an open position, wherein the moveable jaw 200 may be rotated about a fixed pin 140 in a rotational direction away from an uppermost portion of the fixed jaw 100. For example, when configured in an open position, the shuttle apparatus may comprise a cable channel gap 310 that is sufficiently wide to allow for a cable to pass through and into the cable channel 300. In various embodiments, the apparatus may be configured to transition from a standard position to an open position, for example, upon the execution of a two-step process. As described herein, in various embodiments, the shuttle apparatus may be configured to transition from a standard position to an open position by first applying force to the button interface, and then simultaneously applying an upward vertical force to the attachment portion 20. As described herein, the button element may comprise an angled slot that, upon the displacement of the button element resulting from the pressing force applied thereto, may be substantially aligned with the moveable pin 430 configured to receive the moveable pin 430 upon the displacement of the moveable pin 430 in an upward vertical direction. The slot on the bottom surface of the button may be configured to direct a path of travel along a moveable pin groove, as described herein, such that when the moveable pin 430 is disposed within the slot, an additional vertical force applied to the attachment portion 20 may cause the moveable jaw 200 rotate about the fixed pin 140 into an open position. As shown in FIG. 13, in various embodiments, the application of the upward vertical force to the attachment portion 20 and the subsequent vertical displacement thereof may cause the top surface of the arm 423 of the attachment portion 20 to engage a bottom surface 181 of the outer shelf 180 of the fixed jaw 100.

Figure 14:
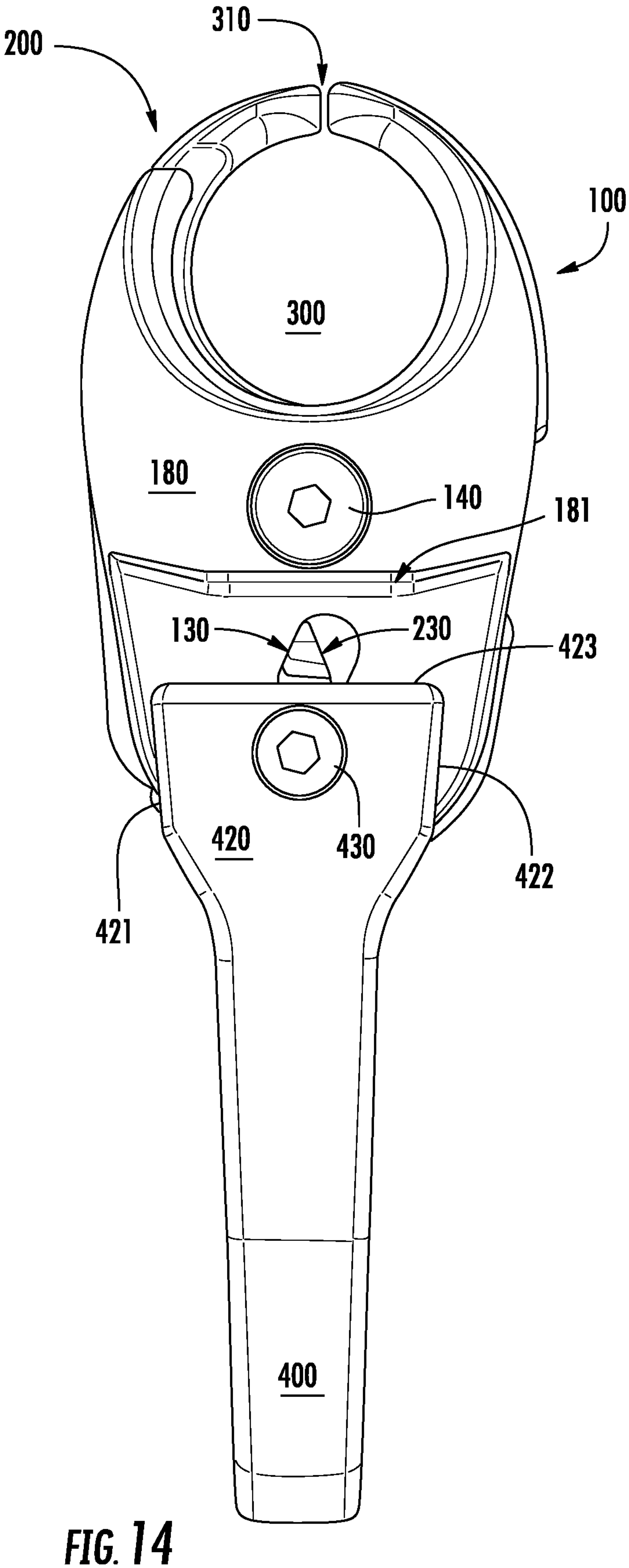
FIG. 14 illustrates a side view of various components of an exemplary apparatus according to an embodiment.

FIG. 14 illustrates a side view of various components of an exemplary apparatus according to an embodiment. In particular, FIG. 14 shows an exemplary shuttle apparatus in a closed position, as described herein. In various embodiments, the shuttle apparatus may transition from a standard position to a closed position, wherein the moveable jaw 200 may be rotated about a fixed pin 140 in a rotational direction towards an uppermost portion of the fixed jaw 100. For example, when configured in a closed position, the cable channel gap 310 define by the moveable jaw 200 and the fixed jaw 100 may be effectively closed or closed. In various embodiments, the moveable jaw 200 may rotate towards the fixed jaw 100 to such an extent so as to physically engage the fixed jaw 100. In a closed position, for example, the cable channel may be reinforced such that a cable disposed within the cable channel 300 may not escape the perimeter established by the shuttle apparatus.

In various embodiments, the shuttle apparatus may be configured in a closed position in response to the attachment portion 20 experiencing a pulling force great enough to overcome the elastic forces of the at least one suspension element 240 as described herein (e.g., during a "fall event") and rotate the moveable jaw 200 towards the fixed jaw 100. For example, the attachment portion 20 may be configured to receive a pulling force from an attachable interface element attached thereto that may effectively pull the attachment portion 20 in a direction away from a cable to which the body portion 10 is attached (e.g., a falling direction). As described herein, such a force may cause the attachment portion 20 to move away from the body portion 10, and thus cause the moveable pin 430 to move along the groove profile of the plurality of moveable pin grooves 130, 230. For example, the moveable pin 430 may be vertically displaced in a downward position so as to be configured within an angled lower portion of the plurality of moveable pin grooves, 130, as described herein. In various embodiments, the angled configuration of the moveable pin grooves 130 may direct the pulling force to a particular point on the moveable jaw 200 such that it may be rotated about the fixed pin 140 to close the cable channel gap 310, thereby preventing the shuttle apparatus from traveling over intermediate brackets of the horizontal lifeline system and reinforcing the connection of the shuttle apparatus to the cable.

Figure 15:
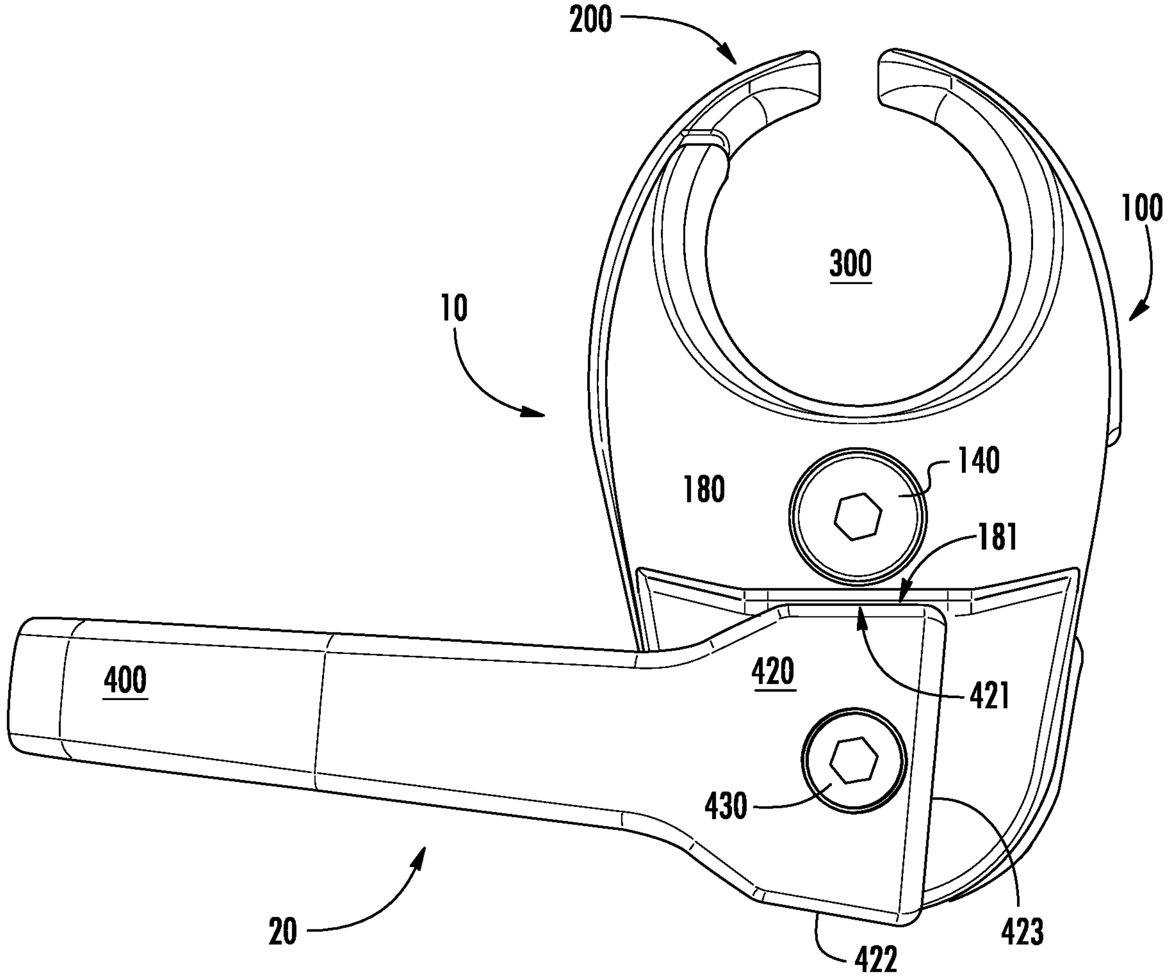
FIG. 15 illustrates a side view of various components of an exemplary apparatus according to an embodiment.

FIG. 15 illustrates a side view of various components of an exemplary apparatus according to an embodiment. In particular, FIG. 15 shows an exemplary shuttle apparatus in a standard position, as described herein. In various embodiments, the attachment portion 20 of the shuttle apparatus may be selectively rotated about a central axis of the moveable pin 430 (e.g., a moveable pin axis). For example, in various embodiments, the attachment portion 20 may have a range of motion of approximately 180 degrees such that the attachment portion 20 may rotate in either a clockwise or counterclockwise direction to an at least substantially horizontal position on either side of the body portion 10. As shown in FIG. 15, the attachment portion 20 is configured in a fully horizontal position, rotated 90 degrees clockwise from the vertical axis. In various embodiments, as the attachment portion 20 is rotated towards a horizontal position, the top surface 423 of the arm 420 may be configured to physically engage the bottom surface 181 of the outer shelf 180 of the fixed jaw 100 so as to interfere with the rotation of the attachment portion 20. In various embodiments, the geometric dimensions of the arm 420 may be such that an increased rotational force is required in order to overcome the resistance exhibited by the arm 420. For example, upon applying an increased force to the attachment portion 20 in the rotation direction, the arm 420 of the attachment portion may be forcibly rotated in to a substantially horizontal configuration wherein the front surface 421 of the arm 420 may be interfaced against the bottom surface 181 of the outer shelf 180 of the fixed jaw 100. As described herein, the configuration of the attachment portion 20 and the fixed jaw 100 wherein an increased rotational force is required to rotate the attachment portion 20 through a particular angle to a substantially horizontal position may comprise a deliberately designed component of the shuttle apparatus that prevents the unadulterated rotation of the attachment portion 20 about its 180-degree range of motion. The force required may function as a mechanism to ensure that the rotation of the attachment portion 20 to the resisted angular position is an intentional rotation.

In various embodiments, when rotated in a substantially horizontal position, the shuttle apparatus may be configured to lock the attachment portion 20 in such a position. For example, the bottom surface 181 of the outer shelf 180 of the fixed jaw 100 may comprise a concave surface configured to create an added difficulty associated with rotating the attachment portion 20 from the horizontal position. In such a configuration, as shown in FIG. 15, the moveable pin 430 may be constrained in the vertical position, due at least in part to the engagement between the front surface 421 of the arm 420 and the bottom surface 181 of the outer shelf 180. As designed, the configuration of the fixed jaw 100 and the attachment portion effectively eliminates the need for a distinct locking mechanism configured to lock the attachment portion in a horizontal position. For example, the apparatus, as described herein, may be configured such that upon rotation of the attachment portion to a horizontal position, the attachment portion is locked in place by the specific geometry of the body portion and the arms of the attachment portion.

It should be understood that while illustrated in a position 90 degrees clockwise from the vertical axis, the attachment portion may be similarly rotated 90 degrees from the vertical axis in the counter-clockwise direction. In such a circumstance, each of the various geometries, resistance forces, and functionalities described above may also exist when the attachment portion is rotated in the counter-clockwise direction.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A horizontal lifeline shuttle apparatus, comprising:

an attachment portion rotatable about an axis of a moveable pin and connected to a body portion by the moveable pin the body portion comprising:

a fixed jaw having a first moveable pin groove; and a moveable jaw having a second moveable pin groove, wherein a cable channel is defined by at least a portion of the fixed jaw and at least a portion of the moveable jaw;

wherein at least a portion of the moveable pin is disposed within the first moveable pin groove of the fixed jaw and the second moveable pin groove of the moveable jaw such that a range of motion of the moveable pin is defined at least in part by the first moveable pin groove of the fixed jaw and the second moveable pin groove of the moveable jaw;

wherein at least one of the first moveable pin groove and the second moveable pin groove comprises a vertical portion and a first non-linear portion;

wherein the horizontal lifeline shuttle apparatus is configurable between an open position, a closed position, and a standard position:

the horizontal lifeline shuttle apparatus being configurable in the closed position based at least in part on a first force acting on the attachment portion in a falling direction, wherein the first force causes the moveable pin to move away from the body portion along the first moveable pin groove and the second moveable pin groove and drives the moveable jaw into the closed position, wherein the closed position is defined at least in part by the moveable jaw rotating about a fixed pin toward the fixed jaw to at least partially close a cable channel gap that is defined adjacent the cable channel between the fixed jaw and the moveable jaw; and the horizontal lifeline shuttle apparatus being configurable in the open position based at least on a two-step operation comprising a compression of a button element and a second force applied to the attachment portion in a second direction different from the falling direction, wherein the second force causes a displacement of the moveable pin that rotates the moveable jaw such that the cable channel gap is widened to a first gap length sufficient wide to allow a cable to pass into the cable channel via the cable channel gap;

wherein the standard position is defined at least in part by the cable channel gap being arranged at a second gap length smaller than the first gap length to prevent the cable from passing therethrough, while enabling movements of a fixed jaw cable channel surface of the fixed jaw and a moveable jaw cable channel surface of the moveable jaw along respective sides of brackets holding up the horizontal lifeline shuttle apparatus.

2. The horizontal lifeline shuttle apparatus of claim 1, wherein the body portion is configured to at least partially surround a portion of the cable so as to retain the portion of the cable within the cable channel.

3. The horizontal lifeline shuttle apparatus of claim 1, wherein the attachment portion comprises:

an eyelet; and the moveable pin, the moveable pin being fixedly disposed between two opposite arms.

4. The horizontal lifeline shuttle apparatus of claim 1, wherein the at least one of the first moveable pin groove and the second moveable pin groove comprising the vertical portion further comprises an S-shaped groove profile, wherein the vertical portion comprises an intermediate portion positioned in between the first non-linear portion and a second non-linear portions.

5. The horizontal lifeline shuttle apparatus of claim 4, wherein the at least one of the first moveable pin groove and the second moveable pin groove comprising the vertical portion further comprises two moveable pin grooves comprising the S-shaped groove profile being arranged in opposite directions and positioned such that the respective vertical portions of each of the two moveable pin grooves comprising the S-shaped groove profile are coaxially aligned.

6. The horizontal lifeline shuttle apparatus of claim 1, wherein the attachment portion is configured to be rotatable 90 degrees relative to a vertical axis to an at least substantially horizontal position on either side of the body portion.

7. The horizontal lifeline shuttle apparatus of claim 6, wherein the attachment portion is lockable in the at least substantially horizontal position via an engagement of at least a portion of the attachment portion with the body portion.

8. The horizontal lifeline shuttle apparatus of claim 7, wherein the portion of the attachment portion comprises one or more of opposite arms of the attachment portion.

9. The horizontal lifeline shuttle apparatus of claim 8, wherein the engagement of the at least the portion of the attachment portion with the body portion comprises a surface of each of one or more arms being configured in an at least substantially flush arrangement against a bottom surface of one or more outer portions of the body portion.

10. The horizontal lifeline shuttle apparatus of claim 1, wherein the fixed jaw and the moveable jaw each define a respective S-shaped groove profile arranged in opposite directions and positioned such that respective vertical portions of the first moveable pin groove and the second moveable pin groove are coaxially aligned and provide a nominal position along a vertical axis in which the moveable pin naturally settles so as to at least partially mitigate one or more effects of production variability.

11. The horizontal lifeline shuttle apparatus of claim 1, wherein the displacement of the moveable pin is a vertical displacement of the moveable pin, the vertical displacement of the moveable pin resulting at least in part from the second force applied to the attachment portion.

12. The horizontal lifeline shuttle apparatus of claim 11, wherein the attachment portion further comprises a bracket disposed between two opposite arms of the attachment portion, the bracket being configured to facilitate an execution of the two-step operation by a user using a single hand.

13. The horizontal lifeline shuttle apparatus of claim 12, wherein the bracket is positioned so as to at least partially block the button element from unwarranted user interaction when the attachment portion is rotated to an at least substantially horizontal position.

* * * * *